United States Patent
Moriuchi

(10) Patent No.: US 12,136,193 B2
(45) Date of Patent: Nov. 5, 2024

(54) IMAGE PROCESSING DEVICE AND IMAGE PROCESSING METHOD FOR CORRECTING A DEPTH VALUE OF A PIXEL OR REGION OF AN IMAGE BASED ON A CONTRIBUTION RATIO

(71) Applicant: SONY GROUP CORPORATION, Tokyo (JP)

(72) Inventor: Yusuke Moriuchi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 422 days.

(21) Appl. No.: 17/600,894

(22) PCT Filed: Mar. 23, 2020

(86) PCT No.: PCT/JP2020/012664
§ 371 (c)(1),
(2) Date: Oct. 1, 2021

(87) PCT Pub. No.: WO2020/209040
PCT Pub. Date: Oct. 15, 2020

(65) Prior Publication Data
US 2022/0188997 A1      Jun. 16, 2022

(30) Foreign Application Priority Data
Apr. 10, 2019   (JP) .................. 2019-075074

(51) Int. Cl.
*G06T 5/50*      (2006.01)
*G06T 7/593*    (2017.01)
*G06V 10/44*    (2022.01)

(52) U.S. Cl.
CPC ............ *G06T 5/50* (2013.01); *G06T 7/593* (2017.01); *G06V 10/44* (2022.01); *G06T 2207/20221* (2013.01)

(58) Field of Classification Search
CPC . G06T 5/50; G06T 7/593; G06T 2207/20221; G06T 7/55;
(Continued)

(56) References Cited

U.S. PATENT DOCUMENTS 9,204,128 B2 * 12/2015 Morioka ................. G03B 35/08
9,313,473 B2 *  4/2016 Yang ...................... H04N 13/15
(Continued)

FOREIGN PATENT DOCUMENTS

JP    2004-139219 A    5/2004
JP    2008-160474 A    7/2008
(Continued)

OTHER PUBLICATIONS

Holynski et al., 2018, "Fast depth densification for occlusion-aware augmented reality" (pp. 194:1-194:11) (Year: 2018).*
(Continued)

*Primary Examiner* — Manav Seth
(74) *Attorney, Agent, or Firm* — Paratus Law Group, PLLC

(57) ABSTRACT

An image processing device includes: a contribution ratio calculation unit that calculates a contribution ratio of a predetermined pixel or a predetermined region in depth calculation in each of a plurality of pixels or a plurality of regions included in an input image; and a correction unit that corrects a depth value of the predetermined pixel or the predetermined region based on the contribution ratio.

19 Claims, 26 Drawing Sheets

(58) Field of Classification Search
CPC . G06T 2207/30241; G06T 7/13; G06T 7/136;
G06T 2207/10016; G06T 7/0004; G06T
2207/10004; G06T 2207/10032; G06T
7/0012; G06T 2207/10024; G06T 5/70;
G06T 7/001; G06T 7/11; G06T 7/12;
G06T 2207/10028; G06T 5/73; G06T
7/0002; G06T 7/62; G06T 2207/20081;
G06T 2207/20016; G06T 7/194; G06T
7/74; G06T 2207/10116; G06T 7/10;
G06T 2207/20084; G06T 3/40; G06T
2207/30148; G06T 3/14; G06T 5/94;
G06T 7/246; G06T 2207/10048; G06T
5/20; G06T 7/73; G06T 2207/30061;
G06T 2207/20032; G06T 2207/30108;
G06T 2207/30164; G06T 7/32; G06T
2200/24; G06T 2207/20024; G06T 7/33;
G06T 7/70; G06T 2207/20192; G06T
2207/30168; G06T 2207/30252; G06T
7/187; G06T 7/60; G06T 7/90; G06T
2207/30201; G06T 3/20; G06T 7/155;
G06T 11/00; G06T 2207/10044; G06T
2207/20056; G06T 2207/20076; G06T
2207/20132; G06T 2207/30096; G06T
2207/30181; G06T 7/248; G06T 7/75;
G06T 17/00; G06T 2207/10061; G06T
11/60; G06T 2207/30196; G06T 5/00;
G06T 5/30; G06T 7/181; G06T 7/337;
G06T 11/001; G06T 2207/10056; G06T
2207/10068; G06T 2207/20036; G06T
2207/30028; G06T 2207/30032; G06T
2207/30244; G06T 3/00; G06T 5/40;
G06T 7/80; G06T 2207/20164; G06T
2207/30124; G06T 3/4038; G06T 15/04;
G06T 2207/20028; G06T 2207/30184;
G06T 2207/30232; G06T 5/75; G06T
5/90; G06T 7/30; G06T 7/66; G06T
15/005; G06T 17/205; G06T 2207/20061;
G06T 2207/20104; G06T 2207/30004;
G06T 2207/30188; G06T 2207/30236;
G06T 2207/30268; G06T 3/04; G06T
5/10; G06T 7/00; G06T 7/0008; G06T
7/149; G06T 7/20; G06T 7/254; G06T
1/0007; G06T 11/008; G06T 17/20; G06T
19/006; G06T 19/20; G06T 2200/08;
G06T 2207/10012; G06T 2207/10081;
G06T 2207/20012; G06T 2207/20064;
G06T 2207/20224; G06T 2207/30041;
G06T 2207/30048; G06T 2207/30176;
G06T 2207/30208; G06T 2207/30248;
G06T 3/60; G06T 5/77; G06T 7/0014;
G06T 7/168; G06T 7/40; G06T 13/40;
G06T 15/06; G06T 15/10; G06T 2200/04;
G06T 2207/10088; G06T 2207/10132;
G06T 2207/20072; G06T 2207/30264;
G06T 3/4007; G06T 3/4053; G06T 5/80;
G06T 5/92; G06T 7/564; G06T 7/571;
G06T 1/20; G06T 11/40; G06T 17/10;
G06T 2200/32; G06T 2207/10136; G06T
2207/10148; G06T 2207/20088; G06T
2207/20208; G06T 2207/30016; G06T
2207/30024; G06T 2207/30036; G06T
2207/30056; G06T 2207/30101; G06T
2207/30116; G06T 2207/30121; G06T
2207/30136; G06T 2207/30144; G06T
2207/30212; G06T 2207/30256; G06T
2210/04; G06T 2210/41; G06T 2215/16;
G06T 3/02; G06T 3/067; G06T 3/608;
G06T 7/006; G06T 7/251; G06T 7/269;
G06T 7/344; G06T 7/44; G06T 7/507;
G06T 9/005; G06T 11/005; G06T 13/00;
G06T 13/80; G06T 17/05; G06T 19/00;
G06T 2207/10112; G06T 2207/10152;
G06T 2207/20; G06T 2207/20004; G06T
2207/20048; G06T 2207/30012; G06T
2207/30068; G06T 2207/30084; G06T
2207/30132; G06T 2207/30242; G06T
3/06; G06T 3/4023; G06T 7/162; G06T
7/174; G06T 7/277; G06T 7/68; G06T
7/77; G06V 10/44; G06V 10/751; G06V
10/7515; G06V 10/443; G06V 40/161;
G06V 10/25; G06V 10/255; G06V 10/28;
G06V 10/40; G06V 20/52; G06V
2201/07; G06V 30/2504; G06V 40/165;
G06V 40/168; G06V 10/457; G06V
10/56; G06V 10/82; G06V 30/10; G06V
30/153; G06V 10/30; G06V 10/462;
G06V 10/50; G06V 10/752; G06V
10/761; G06V 20/586; G06V 2201/08;
G06V 40/10; G06V 40/162; G06V 20/62;
G06V 40/171; G06V 10/267; G06V
10/446; G06V 10/753; G06V 10/764;
G06V 20/00; G06V 20/176; G06V
20/625; G06V 10/22; G06V 10/757;
G06V 10/774; G06V 20/695; G06V
10/20; G06V 20/588; G06V 20/64; G06V
30/2253; G06V 40/167; G06V 40/193;
G06V 40/20; G06V 10/243; G06V
10/431; G06V 10/48; G06V 20/56; G06V
20/647; G06V 40/19; G06V 10/454;
G06V 10/772; G06V 10/893; G06V
20/13; G06V 20/188; G06V 20/194;
G06V 20/46; G06V 20/48; G06V 20/693;
G06V 20/698; G06V 2201/06; G06V
30/224; G06V 40/103; G06V 40/12;
G06V 40/172; G06V 10/10; G06V
10/143; G06V 10/24; G06V 10/247;
G06V 10/26; G06V 10/758; G06V
10/763; G06V 20/40; G06V 20/41;
G06V 20/58; G06V 20/584; G06V 2201/03;
G06V 30/413; G06V 30/418; G06V
10/225; G06V 10/242; G06V 10/273;
G06V 10/34; G06V 10/62; G06V 10/72;
G06V 10/762; G06V 10/771; G06V
10/993; G06V 20/10; G06V 20/17;
G06V 20/42; G06V 20/53; G06V 20/54;
G06V 20/582; G06V 20/597; G06V 20/60;
G06V 20/63; G06V 20/69; G06V
2201/09; G06V 30/1478; G06V 30/18;
G06V 30/1801; G06V 30/19013; G06V
30/19027; G06V 30/19107; G06V
30/287; G06V 30/347; G06V 30/36;
G06V 30/416; G06V 40/107; G06V
40/13; G06V 40/14; G06V 40/16; G06V
40/166; G06V 40/174; G06V 40/18;
G06V 40/197; G06V 40/28; G06V 40/50;
G06V 10/141; G06V 10/147; G06V
10/17; G06V 10/426; G06V 10/46; G06V
10/507; G06V 10/75; G06V 10/759;
G06V 10/766; G06V 10/80; G06V 10/806; G06V 10/809; G06V 20/59;
G06V 20/70; G06V 2201/02; G06V
2201/031; G06V 2201/11; G06V 30/142;
G06V 30/1988; G06V 30/40; G06V
40/113; G06V 40/117; G06V 40/1306;
G06V 40/1347; G06V 40/1388; G06V
40/70; G01B 11/00; H04N 23/60; H04N
2013/0081; H04N 13/128

See application file for complete search history.

(56) References Cited

U.S. PATENT DOCUMENTS

| | | | | |
|---|---|---|---|---|
| 9,508,173 B2 * | 11/2016 | Miura | .................. | G06T 5/50 |
| 2004/0184667 A1 * | 9/2004 | Raskar | .................. | G06T 5/20 |
| | | | | 382/199 |
| 2012/0082368 A1 * | 4/2012 | Hirai | .................. | H04N 13/128 |
| | | | | 382/154 |
| 2014/0002441 A1 * | 1/2014 | Hung | .................. | G06T 7/12 |
| | | | | 345/419 |
| 2014/0093159 A1 * | 4/2014 | Nguyen | .................. | H04N 13/111 |
| | | | | 382/154 |
| 2015/0022518 A1 * | 1/2015 | Takeshita | .................. | G06T 15/205 |
| | | | | 345/419 |
| 2017/0223334 A1 * | 8/2017 | Nobayashi | .................. | H04N 13/128 |
| 2024/0212868 A1 * | 6/2024 | Irwin | .................. | G21B 3/002 |

FOREIGN PATENT DOCUMENTS

| | | | |
|---|---|---|---|
| JP | 2014215840 A | * | 11/2014 |
| JP | 2017-027101 A | | 2/2017 |
| WO | WO 2013/145554 A1 | | 10/2013 |

OTHER PUBLICATIONS

Jonathan T. Barron et al., The Fast Bilateral Solver, European Conference on Computer Vision (ECCV 2016), Jul. 22, 2016, pp. 1-34, arXiv.

Eduardo S. L. Gastal et al., Domain Transform for Edge-Aware Image and Video Processing, ACM Transactions on Graphics, Jul. 2011, pp. 1-11, vol. 30, No. 4.

Jian Sun et al., Stereo Matching Using Belief Propagation, European Conference on Computer Vision (ECCV 2002), Lecture Notes in Computer Science (LNCS), Apr. 2002, pp. 510-524, Springer-Verlag Berlin Heidelberg.

Jian Sun et al., Stereo Matching Using Belief Propagation, IEEE Transactions on Pattern Analysis and Machine Intelligence, Jul. 2003, pp. 1-14, vol. 25, No. 7, IEEE.

Barron Jonathan T et al: "The Fast Bilateral Solver" Sep. 17, 2016 (Sep. 17, 2016), Computer Vision—ECCV 2020 : 16th European Conference, Glasgow, UK, Aug. 23-28, 2020 : Proceedings: [Lecture Notes in Computer Science ; ISSN 0302-9743], Springer International Publishing, Cham, pp. 617-632, XP047565925, ISBN: 978-3-030-58594-5.

Lee Zucheul et al: "Multi-Resolution Disparity Processing and Fusion for Large High-Resolution Stereo Image", IEEE Transactions on Multimedia, IEEE, USA, vol. 17, No. 6,2015/6/1.

* cited by examiner

CONTRIBUTION RATIO OF PIXEL i = $R_{2,i}$

CONTRIBUTION RATIO OF PIXEL i = $R_{3,i}$

CONTRIBUTION RATIO OF PIXEL i = $R_{4,i}$

CONTRIBUTION RATIO OF PIXEL i = $R_{5,i}$

CONTRIBUTION RATIO OF PIXEL i = $R_{6,i}$

CONTRIBUTION RATIO OF PIXEL i = $R_{7,i}$

CONTRIBUTION RATIO OF PIXEL i = $R_{8,i}$

CONTRIBUTION RATIO OF PIXEL i = $R_{9,i}$

FIG.14
DEPTH IMAGE
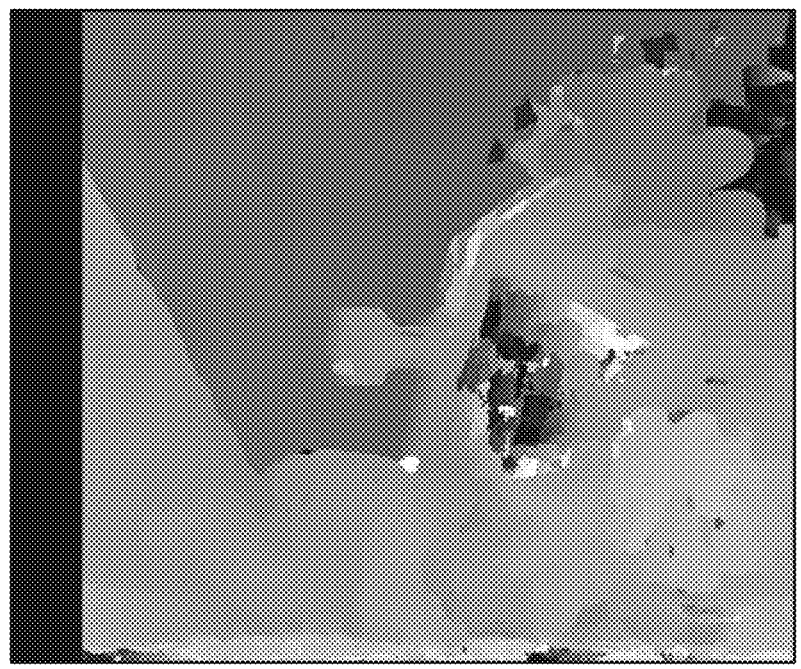
DEPTH-RELOCATED IMAGE
(CORRECTED DEPTH IMAGE)
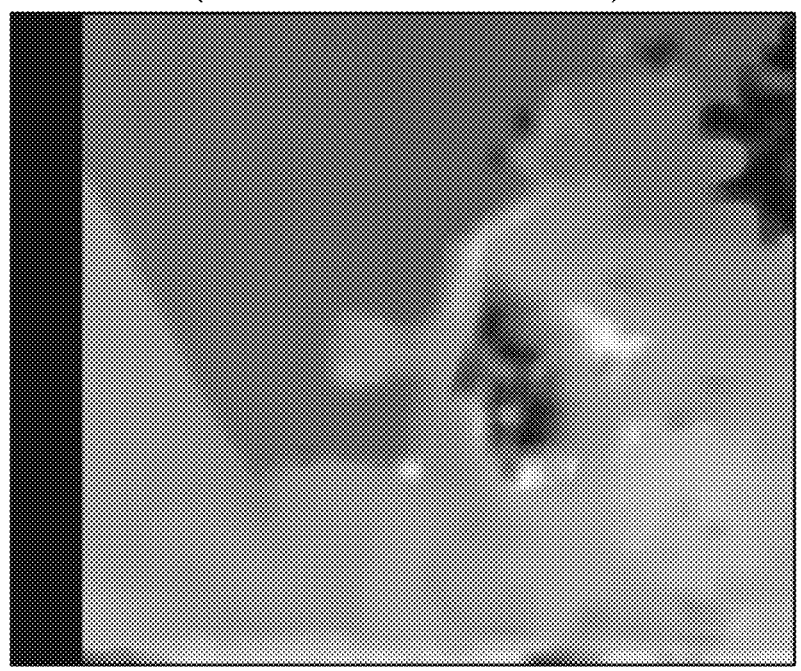

CONTRIBUTION RATIO OF PIXEL j = $R_{i,1}$

CONTRIBUTION RATIO OF PIXEL j = $R_{i,2}$

CONTRIBUTION RATIO OF PIXEL j = $R_{i,3}$

CONTRIBUTION RATIO OF PIXEL j = $R_{i,4}$

CONTRIBUTION RATIO OF PIXEL j = $R_{i,5}$

CONTRIBUTION RATIO OF PIXEL j = $R_{i,6}$ $j=7, (x_j, y_j)=(-1,-1)$

CONTRIBUTION RATIO OF PIXEL j = $R_{i,7}$ $j=8, (x_j, y_j)=(0,-1)$

CONTRIBUTION RATIO OF PIXEL j = $R_{i,8}$ $j=9, (x_j, y_j)=(1,-1)$

CONTRIBUTION RATIO OF PIXEL j = $R_{i,9}$

FIG.22
DEPTH-RELOCATED IMAGE
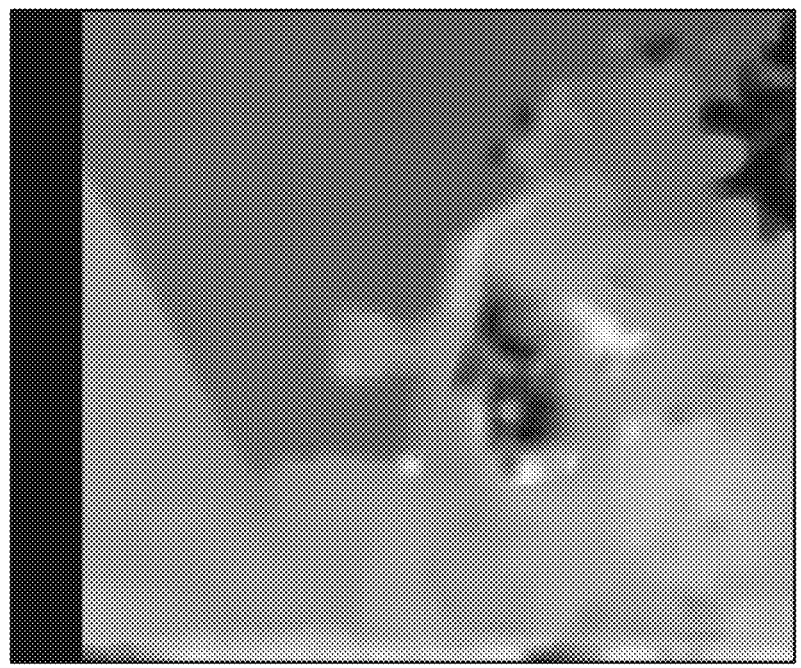
PHASE-CORRECTED IMAGE
(CORRECTED DEPTH IMAGE)
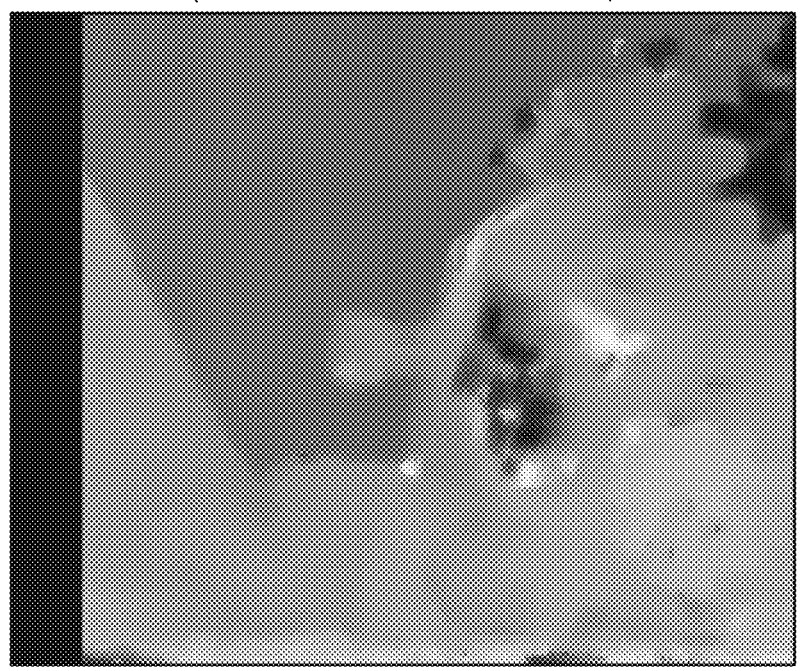

IMAGE PROCESSING DEVICE AND IMAGE PROCESSING METHOD FOR CORRECTING A DEPTH VALUE OF A PIXEL OR REGION OF AN IMAGE BASED ON A CONTRIBUTION RATIO

CROSS REFERENCE TO PRIOR APPLICATION

This application is a National Stage Patent Application of PCT International Patent Application No. PCT/JP2020/012664 (filed on Mar. 23, 2020) under 35 U.S.C. § 371, which claims priority to Japanese Patent Application No. 2019-075074 (filed on Apr. 10, 2019), which are all hereby incorporated by reference in their entirety.

FIELD

The present disclosure relates to an image processing device and an image processing method.

BACKGROUND

There is a known technique of calculating a depth value from a stereo image or an image plane phase difference pixel. The depth value is a distance from an imaging device to a subject, for example. When a stereo image is used for calculating the depth value, the image processing device calculates a parallax amount between a standard image and a reference image input as the stereo image, for example, and then calculates a distance to the object using the principle of triangulation based on the calculated parallax amount.

CITATION LIST

Patent Literature

Patent Literature 1: JP 2004-139219 A
Patent Literature 2: JP 2017-27101 A
Patent Literature 3: WO 2013/145554 A

Non Patent Literature

Non Patent Literature 1: Jonathan T Barron and Ben Poole, "The fast bilateral solver", In European Conference on Computer Vision (ECCV), pages 617-632, Springer International Publishing, 2016
Non Patent Literature 2: E. S. L. Gastal and M. M. Oliveira, "Domain transform for edge-aware image and video processing", ACM Transactions on Graphics, vol. 30, no. 4, 2011
Non Patent Literature 3: J. Sun, N. Zheng, and H. Y. Shum, "Stereo matching using belief propagation", IEEE Transactions on Pattern Analysis and Machine Intelligence, vol. 25, no. 7, pp. 787-800, 2003

SUMMARY

Technical Problem

However, it would be sometimes difficult, with the conventional methods, to obtain a highly accurate depth value or a depth image. For example, in a case of a method of calculating the depth value using a stereo image or an image plane phase difference pixel, calculation of the depth value of one pixel uses values of a plurality of pixels around the pixel to be the target of the calculation of the depth value. However, this method calculates the depth value on the assumption that the plurality of pixels is positioned at the same distance, and thus, there is a possibility of occurrence of a failure in calculating a highly accurate depth value in a case where pixels at different distances are included in the plurality of pixels.

In view of this issue, the present disclosure proposes an image processing device and an image processing method capable of acquiring a highly accurate depth value or a depth image.

Solution to Problem

To solve the above problem, an image processing device according to the present disclosure includes: a contribution ratio calculation unit that calculates a contribution ratio of a predetermined pixel or a predetermined region in depth calculation in each of a plurality of pixels or a plurality of regions included in an input image; and a correction unit that corrects a depth value of the predetermined pixel or the predetermined region based on the contribution ratio.

BRIEF DESCRIPTION OF DRAWINGS

FIG. 14 is a view illustrating a depth image and a corrected depth image obtained by correcting the depth image.

FIG. 22 is a view illustrating a depth image and a phase-corrected image obtained by correcting the depth image.

DESCRIPTION OF EMBODIMENTS

Figure 1:
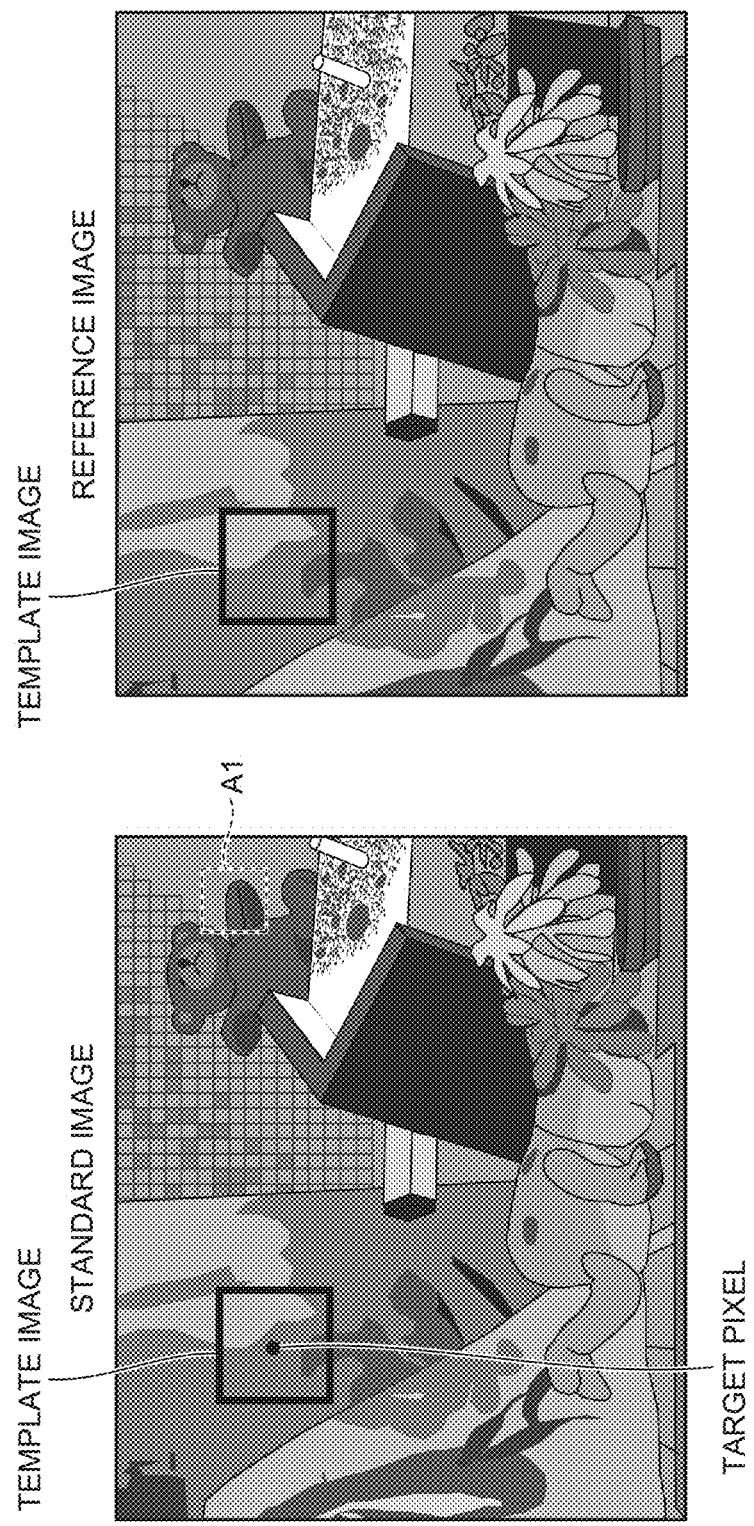
FIG. 1 is a diagram illustrating an example of a stereo image.

Embodiments of the present disclosure will be described below in detail with reference to the drawings. In each of the following embodiments, the same parts are denoted by the same reference symbols, and a repetitive description thereof will be omitted.

The present disclosure will be described in the following order.

1. Introduction
2. First Embodiment
2-1. Configuration of image processing device
2-2. Operations of image processing device
3. Second embodiment (correction based on correction intensity)
3-1. Configuration of image processing device
3-2. Operations of image processing device
4. Third embodiment (calculation of correction intensity based on unevenness)
4-1. Configuration of image processing device
4-2. Operations of image processing device
5. Modification
6. Conclusion

1. Introduction

An image processing device 10 according to the present embodiment is a device that generates a depth image (or calculates a depth value) based on a stereo image in stereo image processing or a phase difference detection signal (image plane phase difference pixel) in Image Plane Phase Detection Autofocus (AF). The image processing device 10 according to the present embodiment corrects the depth image or the depth value generated based on the stereo image or the phase difference detection signal (image plane phase difference pixel) by using a contribution ratio of each of pixels in the calculation of the depth value (hereinafter, referred to as depth calculation), thereby correcting a pseudo depth generated at the time of the depth calculation. This makes it possible to achieve highly accurate applications such as foreground/background extraction and refocusing processing using depth images.

The technology described in the present embodiment (hereinafter, referred to as the present technology) is a technology of correcting an output result of calculation based on a comparison of image signals represented by template matching or the like. More specifically, the present technology is a technology of correcting an output result erroneously estimated by a device when an output value of an image signal used for calculation of the output result is not uniform. This makes the present technology to be advantageous in that it is widely applicable to various tasks in the field of computer vision that calculates outputs from comparison of image signals. In addition to depth estimation, the present technology can applicable also to optical flow estimation and correction of output results of various tasks such as object detection/tracking.

Hereinafter, before giving details of the image processing device 10 of the present embodiment, an outline of the present embodiment will be described.

A method of obtaining a distance from a captured image represented by stereo image processing is widely used in the field of computer vision due to the unnecessity of alignment of the captured image with a depth image as a distance estimation result, and the unnecessity of additional hardware other than a camera.

FIG. 1 is a diagram illustrating an example of a stereo image. In the case of the stereo image processing, the image processing device calculates the parallax amount between the standard image and the reference image input as the stereo image, and calculates the distance to the object based on the calculated parallax amount according to the principle of triangulation.

For the calculation of the parallax amount, template matching (block matching) has been used since early times because of an advantage of ability to perform close association. For example, the image processing device defines an image around a depth value calculation target pixel (hereinafter, referred to as a target pixel) as a template image (template image of a standard image illustrated in FIG. 1), and searches for an image region corresponding to the template image (template image of a reference image illustrated in FIG. 1) from the reference image.

However, since evaluation value calculation as an association index in the template matching is performed on the assumption that the pixels in a template image are at the same distance, the depth calculation would fail when the target pixel of the template image and the region (peripheral pixel) other than the target pixel are at different distances.

Figure 2:
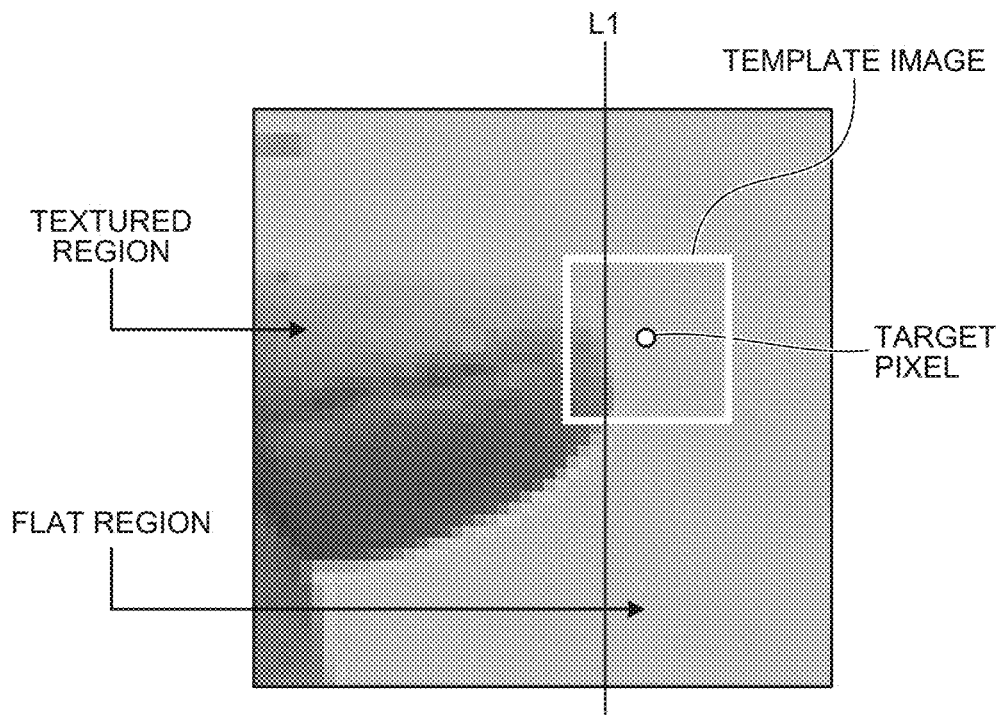
FIG. 2 is a partially enlarged view of a standard image illustrated in FIG. 1.

FIG. 2 is a partially enlarged view of a standard image illustrated in FIG. 1. Specifically, FIG. 2 is an enlarged view of range A1 of the standard image illustrated in FIG. 1. For example, as illustrated in FIG. 2, here is an assumable case where a textured region with a large feature amount of image and a flat region with a small feature amount of image are at different distances in a depth direction. In the example of FIG. 2, the left hand of the stuffed bear corresponds to the textured region, while the wall behind the stuffed bear corresponds to the flat region. The two are separated from each other in the depth direction.

Here, it is assumed that the target pixel is in the flat region and part of its peripheral pixels are in the textured region. In such a case, since the image features of the peripheral pixels would affect the depth determination in the process of evaluation value calculation, the depth of the target pixel position in the flat region would be erroneously estimated as the depth of the textured region. This leads to occurrence of a phenomenon in which a pseudo depth, which is different from the actual depth, is allocated as the depth of the target pixel position.

Figure 3:
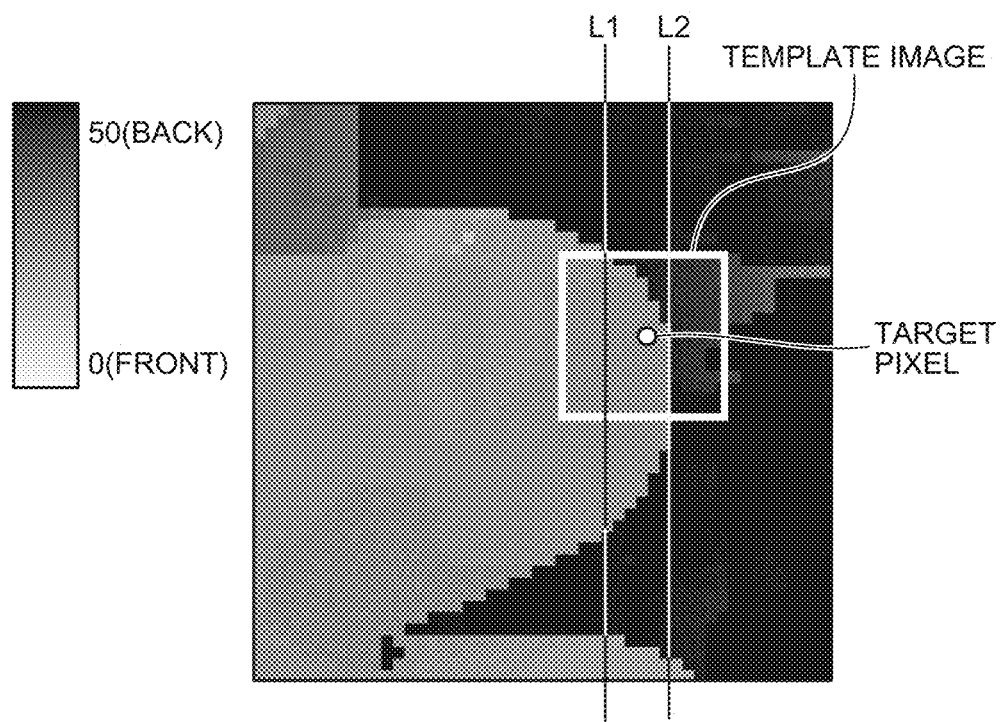
FIG. 3 is a diagram illustrating a state in which pseudo depth occurs.

FIG. 3 is a diagram illustrating a state in which a pseudo depth occurs. In the example of FIG. 3, it can be seen that the depth of the target pixel which should be located on the wall behind the stuffed bear is erroneously estimated as the depth of the left hand of the stuffed bear. In the example of FIG. 3, the left hand whose tip should be on line L1 spreads to line L2.

The principle of occurrence of the pseudo depth has been briefly described as above. Hereinafter, the relationship between the occurrence range of the pseudo depth and the template image size in the template matching will be described.

Figure 4A:
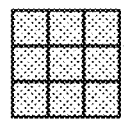
FIG. 4A is a template image of 3×3 in length×width.
Figure 4B:
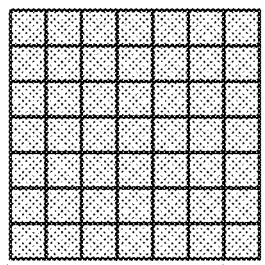
FIG. 4B is a template image of 7×7 in length×width.

FIG. 4A is a template image of 3×3 in length×width. FIG. 4B is a template image of 7×7 in length×width. A single cell in the drawing corresponds to a single pixel. The template image illustrated in FIG. 4A is formed with 3×3 pixel groups of R, G, and B arranged in a Bayer array, for example. Furthermore, the template image illustrated in FIG. 4B is formed with 7×7 pixel groups of R, G, and B arranged in a Bayer array, for example.

Here is an assumable case where a depth at each pixel position of the template image is allocated as a depth at a target pixel in the center of the template image by template matching. In this case, the phase shift is maximized when the depth of surrounding pixels of the template image is erroneously allocated to the target pixel. When the maximum value of the phase shift that can occur is defined as an occurrence range of the pseudo depth, the occurrence range of the pseudo depth can be described as the following Formula (1) using the floor function.

$$\lfloor R/2 \rfloor \qquad (1)$$

Here, R is a length of one side of the template image. In the examples of FIGS. 4A and 4B, a shift of one pixel and a shift of three pixels are pseudo depth occurrence ranges, respectively.

The pseudo depth similarly occurs not only in distance estimation (depth calculation) based on a stereo image but also in distance estimation (depth calculation) based on an image plane phase difference pixel. Hereinafter, the occurrence range of the pseudo depth that occurs in the distance estimation based on the image plane phase difference pixel will be described.

In recent years, distance estimation using image plane phase difference pixels has been widely adopted as distance estimation used for focusing of a camera or the like. The reason of wide application of the distance estimation using the image plane phase difference pixel is the capability of making a compact design that has eliminated a mirror structure. In this distance estimation, for example, the distance is determined by regarding a signal obtained from an array of image plane phase difference pixel pairs in which the left and right sides of pixels on the image sensor are shielded, as a template image of a standard image and a reference image in stereo matching. The association of signal pairs when focused on different distances corresponds to the parallax search in stereo matching, and a distance that achieves highest matching from the array group of pair signals in the image plane phase difference pixels will be determined as the distance of the subject. Incidentally, the image plane phase difference pixel pair is not limited to the pixel pair shielded on the left and right sides, and may be a pixel pair having slits provided at left-right symmetrical positions.

Figure 5:
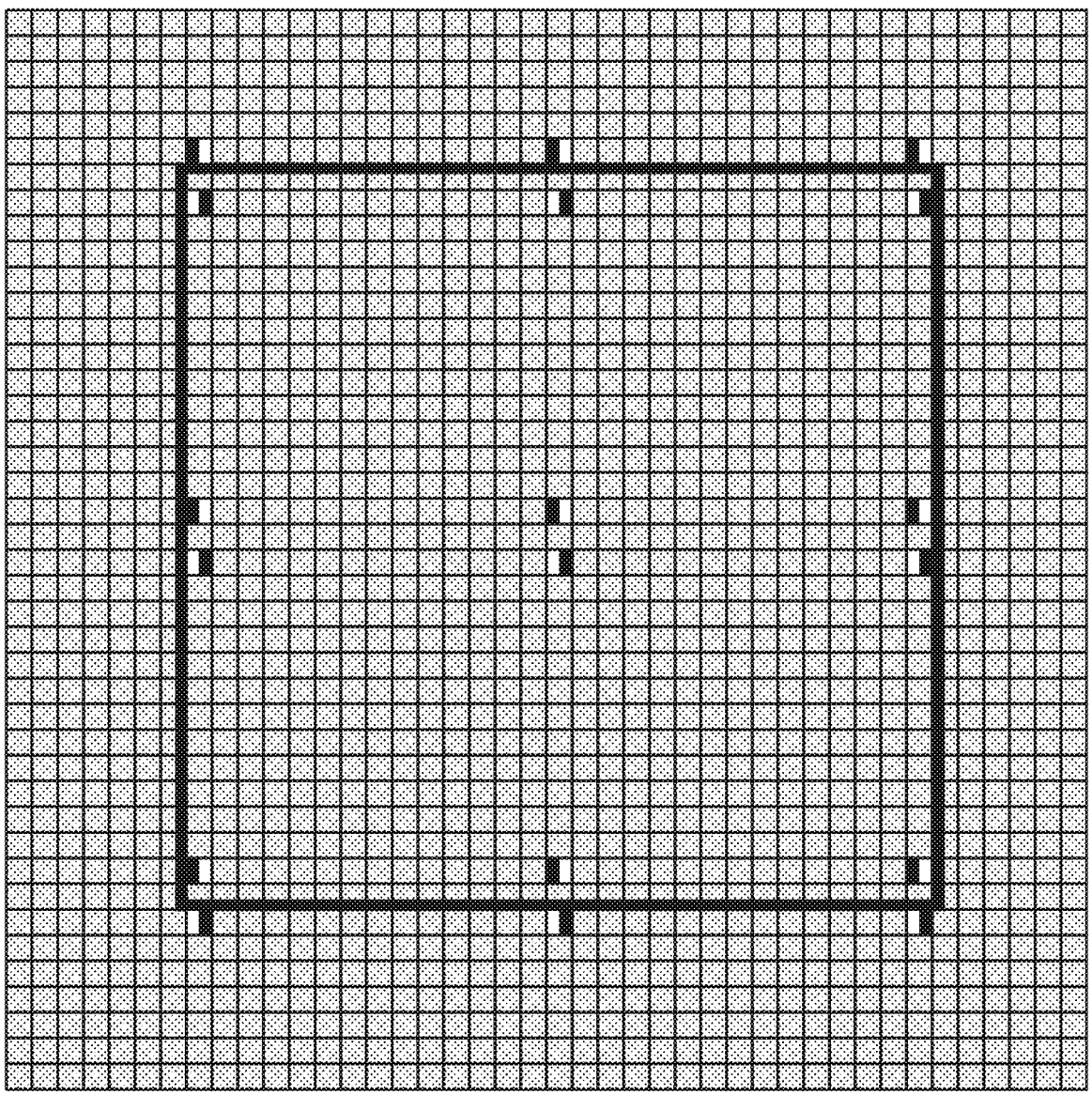
FIG. 5 is an example in which an image plane phase difference pixel pair is arranged in 14×14 pixels.

The image plane phase difference pixels are discretely arranged on the image sensor, leading to a characteristic that, in the distance estimation using the image plane phase difference pixels, the pseudo depth is larger than that at the time of distance estimation in stereo matching. FIG. 5 is an example in which one set of image plane phase difference pixel pair is arranged in 14×14 pixels. A single cell in the drawing corresponds to a single pixel. In the example of FIG. 5, one cell in the drawing is one of R, G, or B pixels arranged in a Bayer array, for example. To facilitate understanding, the central pixel position of the image plane phase difference pixel pair is defined as a signal detection position. In this case, in the distance detection using the image plane phase difference pixel, the image processing device might possibly erroneously allocate the depth of the pixel in the range of the thick frame in FIG. 5 to the target pixel. That is, when the depth is calculated using R×R sets of the image plane phase difference pixel pair arranged in the range of T×T, the occurrence range of the pseudo depth can be described as the following Formula (2).

$$T \lfloor R/2 \rfloor \qquad (2)$$

Assumable examples of methods for solving this include the following methods (M1) and (M2).

(M1) Depth Correction Method Using Smoothing and Optimization with Captured Image Defined as Reference Image For example, there is an assumable case where the correction of a depth image is performed by a method using a filter utilizing similarity of signals of a captured image or a method using an optimization method assuming the Markov Random Field. Examples of above-described methods using a filter include a method using a joint bilateral filter (for example, Patent Literature 1), a method using the joint bilateral filter with higher speeds (for example, Non Patent Literature 1), and a method using a domain transform filter (Non Patent Literature 2). In addition, examples of methods using the Markov Random Field include a method using graph cut (Patent Literature 2) and a method using Belief Propagation (Non Patent Literature 3).

Unfortunately, however, even though the above methods have an effect of relocating the depth boundary along the structure of the captured image used for reference, the correct depth is not expected to be able to be obtained because smoothing and optimization is performed based on the erroneously estimated depth. In particular, depth estimation under a high noise environment or depth estimation using phase difference pixel information having a wide phase difference pixel interval tends to set the template image to a large size, increasing the erroneous estimation region, which presumably would make the present problem remarkable.

(M2) Depth Correction Method Using Depth Reliability

For example, there is another assumable method (for example, Patent Literature 3) in which, when the depth is corrected by filtering or weighted mean using similarity of the signals of the captured image described above, an attempt is made to enhance correction accuracy by using the reliability of the output depth as a weight in addition to the feature amount calculated from the captured image. Highly accurate correction using a highly reliable and stable depth is considered to be achieved by using an evaluation value of template matching at the time of determining the depth and the feature amount of an image, such as an edge gradient of the captured image, as the reliability of the depth. Unfortunately, however, even when the evaluation value is used as the reliability, the reliability is considered to be higher in the erroneous estimation region where the flat region and the textured region are mixed in the template image as a correction target than in a case where the template image is formed with a flat region. Therefore, it would be considered to be difficult to correct erroneous estimation depth that has occurred in the template matching, which is a target of the present embodiment.

In view of these, the image processing device 10 according to the present embodiment executes the following processing.

For example, the image processing device 10 corrects an erroneous estimation result that occurs when regions in which different output values are expected are mixed in a template image for an output result of calculation obtained by comparing image signals represented by template matching or the like. For example, in stereo image processing, the image processing device 10 corrects the pseudo depth occurring in a case where pixels at different distances are mixed in the template image. For example, when there are a textured region and a flat region at different distances in the template image, the image processing device 10 corrects the pseudo depth erroneously estimated in the flat region.

Specifically, the image processing device 10 executes the following processes.

For example, in order to correct the pseudo depth occurring in template matching, the image processing device 10 calculates a contribution ratio indicating the degree of influence of each of pixels in the template image when the depth of the target pixel is calculated. The image processing device 10 then distributes the depth of the target pixel to each of the pixels in the template image based on the calculated contribution ratio.

Figure 6:
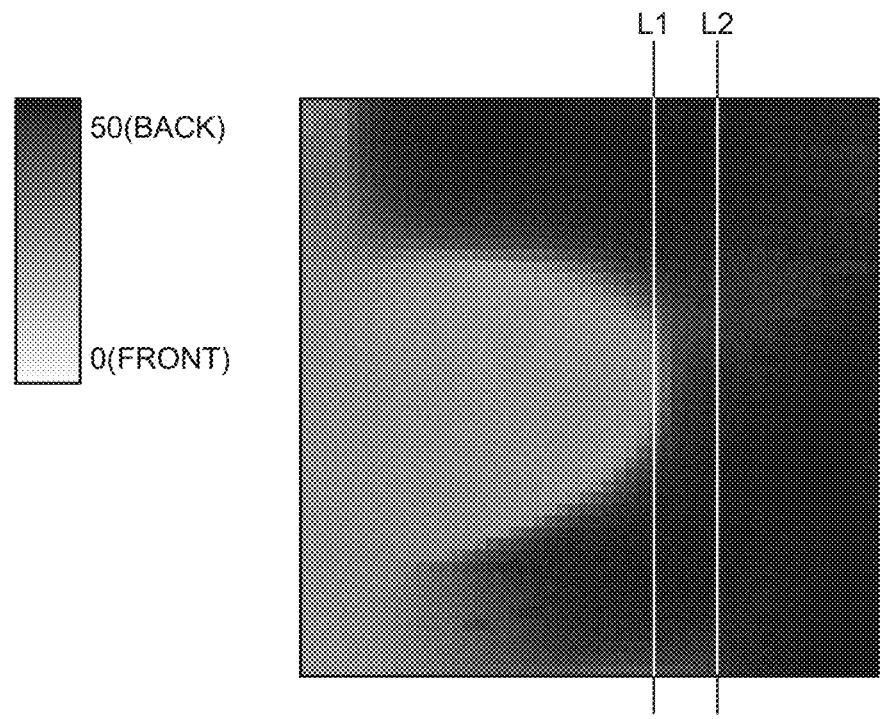
FIG. 6 is a diagram illustrating a corrected depth image obtained by correcting with the method described in the present embodiment.

With this operation, the depth is relocated to the pixel contributing to the depth calculation in the pixel in the template image, leading to the reduction of the pseudo depth. FIG. 6 is a diagram illustrating a corrected depth image obtained by correcting with the method described in the present embodiment. It can be seen that the depth of the left hand of the stuffed bear spread to line L2 in the example of FIG. 3 described above has retreated to line L1, which is the correct position, in the example of FIG. 6. With comparison of FIG. 3 and FIG. 6, it is obvious that the use of the method illustrated in the present embodiment achieves the reduction of the pseudo depth.

2. First Embodiment

The outline of the present embodiment has been described as above. Hereinafter, the image processing device 10 according to a first embodiment will be described in detail.

In the following description, the image processing device 10 calculates the depth value based on the stereo image. Alternatively, however, the image processing device 10 may calculate the depth value based on the image plane phase difference pixel.

In the following description, to facilitate understanding, the image processing device 10 is supposed to calculate the depth value of each of pixels of the input image (for example, the captured image). At this time, the target pixel to be the calculation target of the depth value may be each of pixels of the captured luminance image, or may be each of image plane phase difference pixels discretely arranged on the image sensor.

Incidentally, the image processing device 10 may calculate the depth value of a predetermined region of the input image instead of the depth value of each of pixels. For example, the image processing device 10 may determine a region (for example, a region of 14×14 pixels in the example of FIG. 5) represented by one image plane phase difference pixel pair, as a calculation target of the depth value. This modification can be applied not only to the case of calculating the depth value based on the image plane phase difference pixel but also to the case of calculating the depth value based on the stereo image. In a case where the calculation target of the depth value is not a pixel but a region, the description of "pixel" in the following description can be appropriately replaced with "region".

2-1. Configuration of Image Processing Device

First, the configuration of the image processing device 10 according to the first embodiment will be described.

Figure 7:
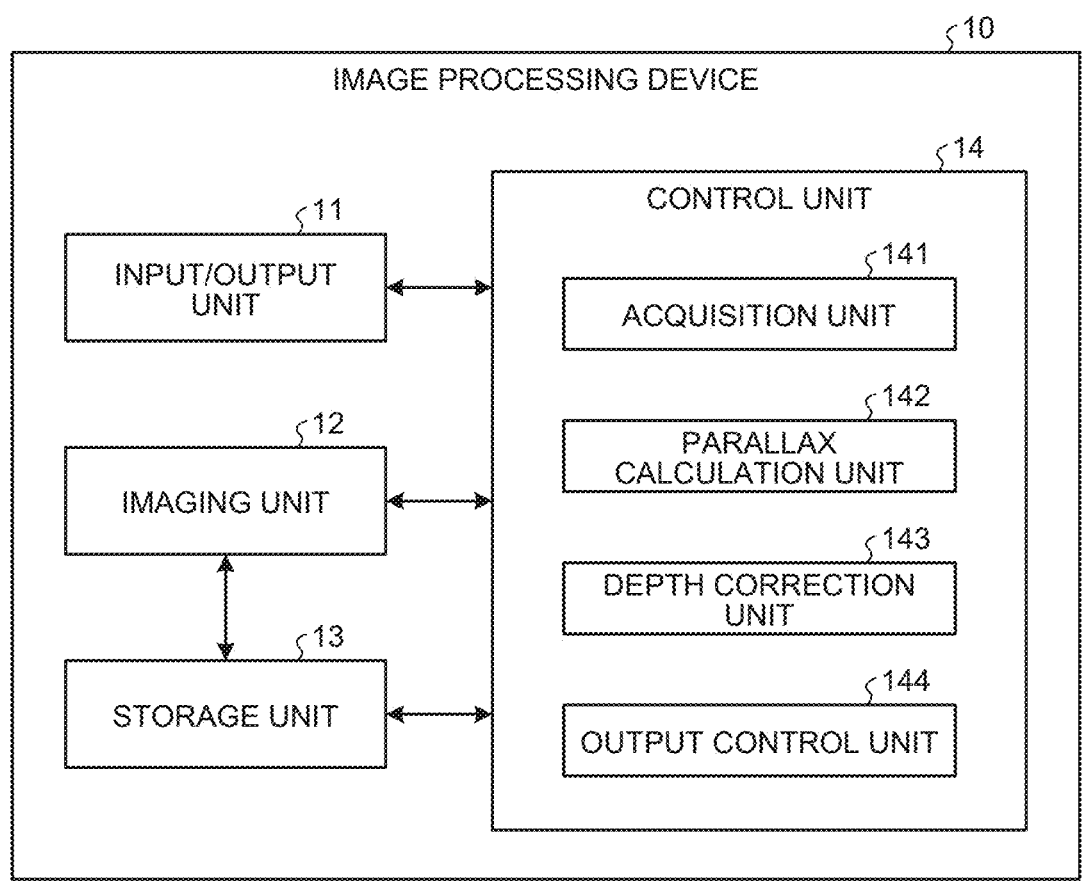
FIG. 7 is a diagram illustrating a configuration example of an image processing device according to a first embodiment.

FIG. 7 is a diagram illustrating a configuration example of the image processing device 10 according to the first embodiment. The image processing device 10 is a device with an image processing function. Specific examples of the image processing device 10 include a mobile phone, a smart device (smartphone or tablet), a camera (for example, a digital still camera or a digital video camera), a personal digital assistant (PDA), and a personal computer. The image processing device 10 may be a car navigator, a head-up display, a navigation display, a Machine to Machine (M2M) device, or an Internet of Things (IoT) device. The image processing device 10 may be a device (for example, an image processing processor) mounted on these devices.

Furthermore, the image processing device 10 may be a device mounted on a mobile body. At this time, the image processing device 10 may be a device constituting a part of a mobile body operation (driving) support system (for example, an automatic braking system (also referred to as a collision avoidance system, a collision damage reduction system, or an automatic stop system), a danger detection system, a tracking system, a car navigation system, or the like) or may be a device constituting a part of a mobile body autonomous traveling control system (for example, an autonomous driving system). Naturally, the image processing device 10 may simply be a device constituting a part of a mobile body traveling control system. Note that the image processing device 10 may be a system that directly supports operation (driving) of a moving object, or may be a system that directly controls autonomous traveling of the moving object. Naturally, the image processing device 10 may be a device that directly controls traveling of a mobile body. Furthermore, the image processing device 10 may be a mobile body itself.

The mobile body may be a mobile body that moves on the ground (strictly, a land) (for example, a vehicle such as an automobile, a motorcycle, a bus, a truck, a motorbike, a train, or a linear motor car), or a mobile body (for example, subway) that moves under the ground (for example, through a tunnel). The mobile body may be a mobile body that moves on the water (for example, a ship such as a passenger ship, a cargo ship, and a hovercraft), or a mobile body that moves underwater (for example, a submersible boat, a submarine, an unmanned submarine, or the like). Furthermore, the mobile body may be a mobile body that moves in the atmosphere (for example, an aircraft such as an airplane, an airship, or a drone), or may be a mobile body that moves outside the atmosphere (for example, an artificial astronomical object such as an artificial satellite, a spaceship, a space station or a spacecraft).

The concept of the aircraft includes not only heavy aircraft such as an airplane and a glider but also light aircraft such as a hot-air balloon and an airship. In addition, the concept of an aircraft includes not only a heavy aircraft and a light aircraft but also a rotorcraft such as a helicopter and an auto-gyro. Note that the aircraft station device (or an aircraft on which an aircraft station device is mounted) may be an unmanned aerial vehicle such as a drone.

The image processing device 10 is not limited to a system that controls autonomous traveling of a device mobile body constituting a part or all of a system that supports traveling of the mobile body, and may be a device constituting a part or all of a system intended for measurement or surveillance, for example.

As illustrated in FIG. 7, the image processing device 10 includes an input/output unit 11, an imaging unit 12, a storage unit 13, and a control unit 14. Note that the configuration illustrated in FIG. 7 is a functional configuration, and the hardware configuration may be different from this. Furthermore, the functions of the image processing device 10 may be distributed and implemented in a plurality of physically separated devices.

The input/output unit 11 is a user interface for exchanging information with the user. For example, the input/output unit 11 is an operation device such as a keyboard, a mouse, operation keys, and a touch panel, used by a user to perform various operations. Alternatively, the input/output unit 11 is a display device such as a liquid crystal display, or an organic Electroluminescence (EL) display. The input/output unit 11 may be an acoustic device such as a speaker or a buzzer. Furthermore, the input/output unit 11 may be a lighting device such as a light emitting diode (LED) lamp. The input/output unit 11 functions as an input/output means (input means, output means, operation means, or notification means) provided on the image processing device 10.

The input/output unit 11 may be a communication interface for communicating with other devices. At this time, the input/output unit 11 may be a network interface or a device connection interface. For example, the input/output unit 11 may be a local area network (LAN) interface such as a network interface card (NIC), or may be a universal serial bus (USB) interface including a USB host controller, a USB port, or the like. Furthermore, the input/output unit 11 may be a wired interface or a wireless interface. The input/output unit 11 functions as a communication means in the image processing device 10. The input/output unit 11 communicates with other devices under the control of the control unit 14.

The imaging unit 12 is a camera including an image sensor that images an object. The imaging unit 12 may be a camera capable of capturing a still image or a camera capable of capturing a moving image. The imaging unit 12 is a stereo camera, for example. The imaging unit 12 may be a monocular camera. The imaging unit 12 may include an image sensor in which image plane phase difference pixels are discretely embedded. The imaging unit 12 functions as an imaging means in the image processing device 10.

The storage unit 13 is a data readable/writable storage device such as dynamic random access memory (DRAM), static random access memory (SRAM), a flash drive, or a hard disk. The storage unit 13 functions as a storage means in the image processing device 10. The storage unit 13 stores an image (for example, a luminance image) captured by the imaging unit 12 and a depth image generated by the parallax calculation unit 142 or the like described below, for example.

The control unit 14 is a controller that controls individual components of the image processing device 10. The control unit 14 is actualized by a processor such as a central processing unit (CPU) or a micro processing unit (MPU). The control unit 14 may be configured to control an image processor that is outside the control unit 14 and executes the depth correction process to be described below, or may be configured to be capable of directly executing the depth correction process. The functions of the control unit 14 are actualized by execution of various programs stored in the storage device inside the image processing device 10 by the processor using random access memory (RAM) or the like as a work area. Note that the control unit 14 may be actualized by an integrated circuit such as an application specific integrated circuit (ASIC) or a field programmable gate array (FPGA). The CPU, MPU, ASIC, and FPGA can all be regarded as controllers.

The control unit 14 includes an acquisition unit 141, a parallax calculation unit 142, a depth correction unit 143, and an output control unit 144. Individual blocks (acquisition unit 141 to output control unit 144) constituting the control unit 14 are functional blocks individually indicating functions of the control unit 14. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 14 may be configured in a functional unit different from the above-described functional block.

The depth image is generated by the parallax calculation unit 142, while the depth image is corrected by the depth correction unit 143. Hereinafter, the functions of the parallax calculation unit 142 and the depth correction unit 143 will be described using a functional block diagram. Note that the functional blocks included in the parallax calculation unit 142 and the depth correction unit 143 may be one software module implemented by software, or may be one circuit block on a semiconductor chip. Needless to say, each of the functional blocks may be formed as one processor or one integrated circuit. The functional block may be configured by using any method. Note that the parallax calculation unit 142 and the depth correction unit 143 may be configured by functional units different from the following functional blocks.

[Parallax Calculation Unit]

Figure 8:
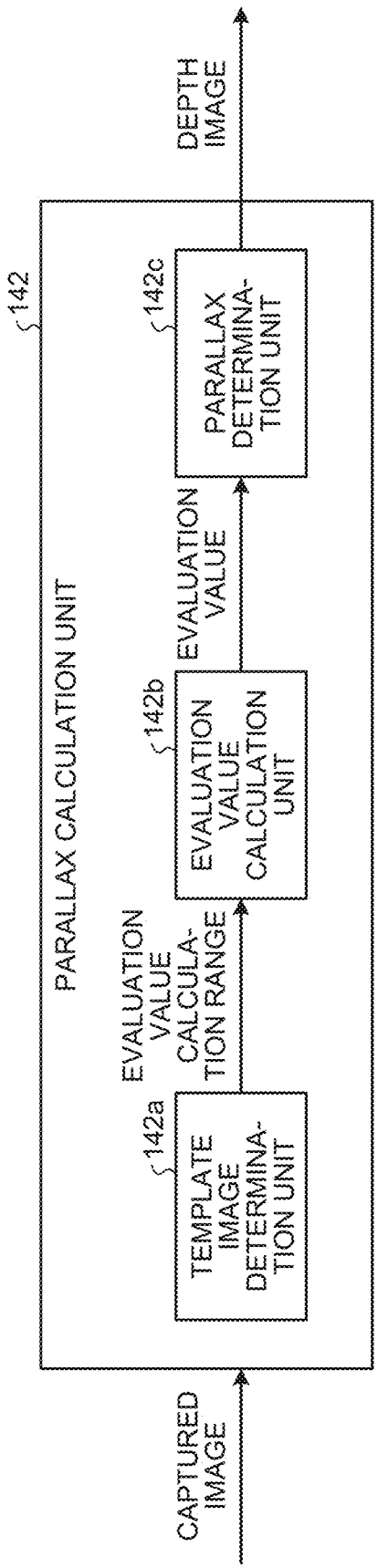
FIG. 8 is a diagram illustrating a configuration example of a parallax calculation unit.

The parallax calculation unit 142 calculates a depth value of each of pixels (or each of regions) of the captured image (hereinafter, referred to as depth calculation) and generates a depth image based on the depth value. FIG. 8 is a diagram illustrating a configuration example of the parallax calculation unit 142. The parallax calculation unit 142 includes a template image determination unit 142a, an evaluation value calculation unit 142b, and a parallax determination unit 142c. The template image determination unit 142a acquires a captured image from the storage unit 13. The captured image may be an image acquired by the acquisition unit 141 from the imaging unit 12, or may be an image acquired by the acquisition unit 141 from an external device via the input/output unit 11. The template image determination unit 142a then determines a calculation range of the evaluation value. Subsequently, the evaluation value calculation unit 142b calculates an evaluation value. Next, the parallax determination unit 142c generates a depth image based on the evaluation value. Note that the parallax calculation unit 142 may generate the depth image by a conventional method or may generate the depth image by a method different from the conventional method.

[Depth Correction Unit]

The depth correction unit 143 corrects the depth image generated by the parallax calculation unit 142 to generate a corrected depth image. At this time, the depth correction unit 143 corrects the depth value calculated by the parallax calculation unit 142, thereby calculating the corrected depth value. The depth correction unit 143 then generates a corrected depth image based on the corrected depth value.

Figure 9:
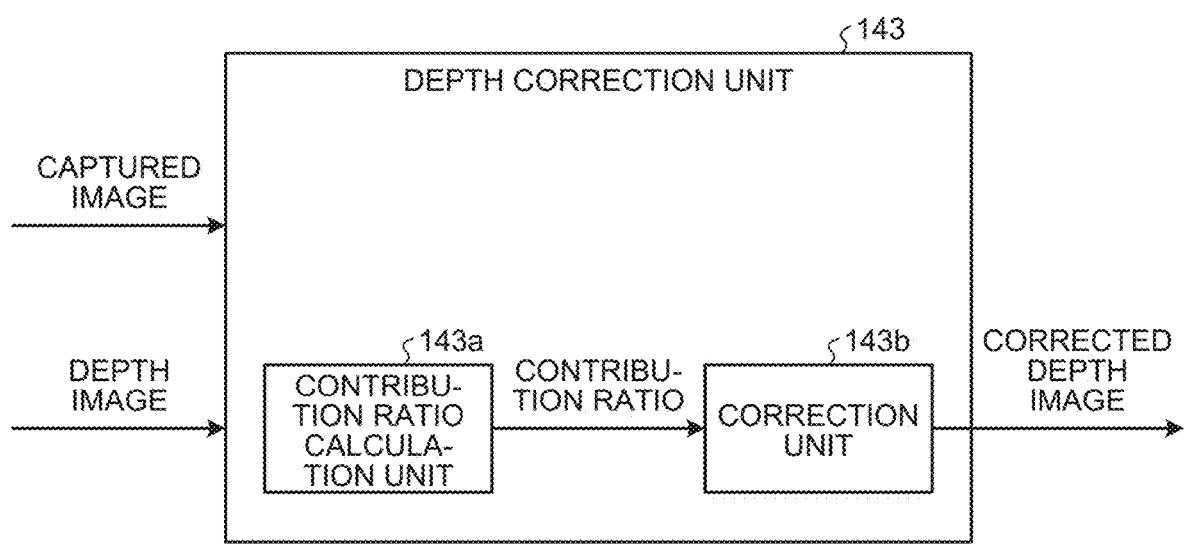
FIG. 9 is a diagram illustrating a configuration example of a depth correction unit.

FIG. 9 is a diagram illustrating a configuration example of the depth correction unit 143. The depth correction unit 143 includes a contribution ratio calculation unit 143a and a correction unit 143b. The contribution ratio calculation unit 143a acquires a captured image from the storage unit 13 and acquires a depth image corresponding to the captured image. The depth image may be an image generated by the parallax calculation unit 142 or may be an image acquired by the acquisition unit 141 from an external device via the input/output unit 11. The contribution ratio calculation unit 143a then calculates the contribution ratio of the target pixel (or the target region) in the depth calculation of each of the plurality of pixels (or plurality of regions) included in the input image (captured image). Subsequently, the correction unit 143b corrects the depth value of the target pixel (or the target region) based on the contribution ratio calculated by the contribution ratio calculation unit 143a. The correction unit 143b then generates a corrected depth image based on the corrected depth value.

2-2. Operations of Image Processing Device

Next, operations of the image processing device 10 according to the first embodiment will be described.

Figure 10:
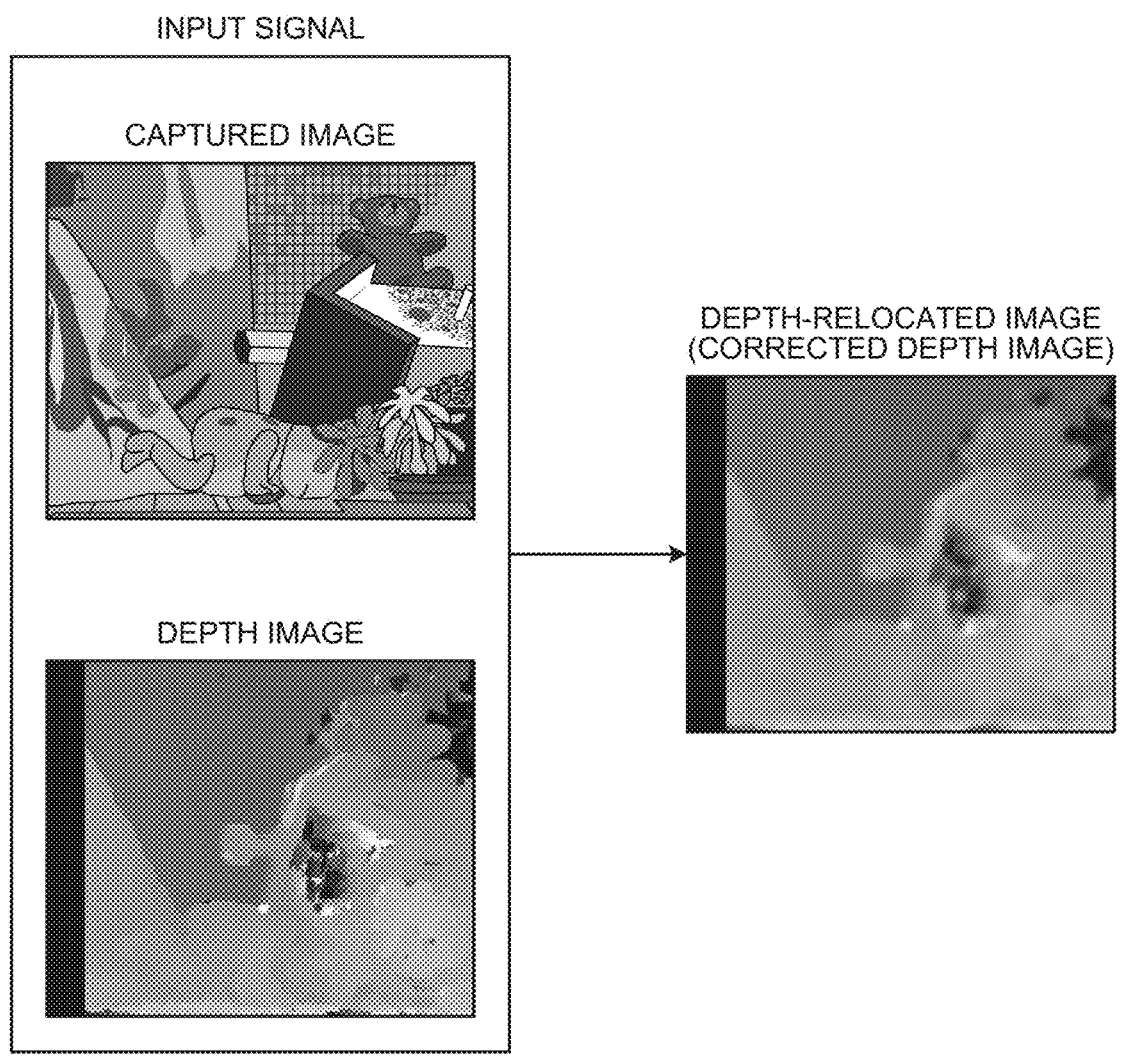
FIG. 10 is a diagram illustrating an example of an input signal that is input to a depth correction unit and a corrected depth image output from the depth correction unit.

The image processing device 10 executes a depth correction process of correcting a depth image. The depth correction process is executed by the depth correction unit 143 of the image processing device 10. FIG. 10 is a diagram illustrating an example of the input signal that is input to the depth correction unit 143 and the corrected depth image output from the depth correction unit 143. In the example of FIG. 10, a captured image and a depth image corresponding to the captured image are input to the depth correction unit 143 as input signals. The depth image may be the image generated by the parallax calculation unit 142 by depth calculation. Subsequently, the depth correction unit 143 outputs a depth-relocated image as a corrected depth image.

Figure 11:
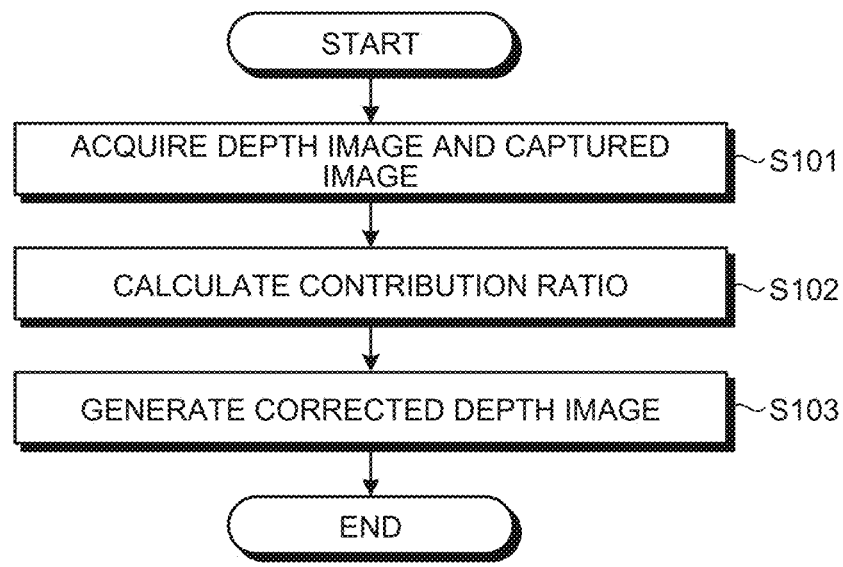
FIG. 11 is a flowchart illustrating a depth correction process according to the first embodiment.

Hereinafter, the depth correction process of the first embodiment will be described in detail. FIG. 11 is a flowchart illustrating the depth correction process according to the first embodiment. As described above, the depth correction process is executed by the depth correction unit 143. For example, after the depth image and the captured image have been input, the depth correction unit 143 starts the depth correction process. Note that a part or all of the processes described below may be implemented by software (program) or by a hardware circuit. In the following description, an exemplary case of the stereo image processing is illustrated, the application of the present embodiment is not limited to the stereo image processing.

First, the contribution ratio calculation unit 143a of the depth correction unit 143 acquires a depth image and a captured image (step S101). The captured image may include a standard image and a reference image. Instead of the parallax calculation unit 142, the contribution ratio calculation unit 143a may determine the depth of a target pixel i by template matching in this step. Still, the parallax calculation unit 142 may determine the depth of the target pixel i. The target pixel i is a pixel as a depth value calculation target, and is, for example, an ith pixel among a plurality of pixels included in the standard image. The contribution ratio calculation unit 143a calculates the contribution ratio based on at least one image out of the standard image and the reference image.

Next, the contribution ratio calculation unit 143a calculates the contribution ratio of the target pixel in the depth calculation of each of the plurality of pixels included in the captured image (step S102). The contribution ratio calculation unit calculates the contribution ratio of the target pixel based on the feature amount of each of the plurality of pixels included in the captured image. The contribution ratio calculation unit 143a may calculate the contribution ratio based on at least one image out of the standard image and the reference image.

The feature amount represents a feature of an image. In an image of FIG. 2 as an example, the feature amount of a pixel in a flat region is a small value, and the feature amount of a pixel in a textured region is a large value. Needless to say, the feature of the feature amount is not limited to this example. For example, the feature amount may be defined such that closer the pixel is positioned to an edge of the image, the larger the feature amount. The contribution ratio calculation unit 143a may calculate the feature amount based on at least one image out of the standard image and the reference image.

An example of the feature amount is edge intensity. At this time, the contribution ratio calculation unit 143a may calculate the contribution ratio of the target pixel based on the edge intensity of each of a plurality of pixels in a predetermined range including the target pixel i (for example, the target pixel and eight pixels adjacent to the target pixel). For example, the contribution ratio calculation unit 143a calculates the intensity of the edge of each of pixels j in the template image used at determination of the depth value in the target pixel i (for example, a predetermined range of the standard image including the target pixel i), and then calculates a contribution ratio $R_{i,j}$ according to the intensity of the edge. Here, the contribution ratio $R_{i,j}$ indicates the contribution ratio of the pixel j in the determination of the depth value in the target pixel i. For example, the contribution ratio calculation unit 143a calculates the contribution ratio $R_{i,j}$ by the following Formula (3).

$$R_{i,j} = I_j / \Sigma_j M_{I_j} \quad (3)$$

In Formula (3), $I_j$ is the edge intensity of the pixel j. For example, the edge intensity may be the intensity calculated using a Sobel filter, a Prewitt filter, a first order differential filter, a Laplacian filter, or a Canny method, or may be the intensity obtained by calculating these in a direction perpendicular to the stereo epipolar line. The method of calculating the edge intensity is not limited thereto, and various known methods can be adopted. Needless to say, the contribution ratio calculation unit 143a may calculate the edge intensity using a unique edge calculation method.

The contribution ratio calculation unit 143a calculates, for all the target pixels i, the contribution ratio in determining the depth value of the pixel (hereinafter, referred to as a pixel j) in which the target pixel i itself is involved. Note that the contribution ratio of the target pixel i in the determination of the depth value of the pixel j becomes $R_{j,i}$ in which i and j of $R_{i,j}$ illustrated in Formula (3) has been switched. Incidentally, the size and shape of the predetermined range for calculating the contribution ratio are not limited to the size and shape of 3×3 in length×width. The size and shape of the predetermined range can be appropriately changed in accordance with the process in step S103 described below.

Next, the correction unit 143b calculates corrected depth values for all the target pixels i based on the contribution ratio and the depth image. The correction unit 143b then generates a corrected depth image (depth-relocated image) based on the corrected depth value (step S103).

Here, the correction unit 143b may calculate a corrected depth value $Y_i'$ obtained by correcting a depth value $Y_i$ of the target pixel i, by using the following Formula (4). An image formed by the corrected depth value $Y_i'$ is to be the corrected depth image (depth-relocated image).

$$Y_i' = \Sigma_j^N R_{j,i} Y_j / \Sigma_j^N R_{j,i} \qquad (4)$$

Figure 12:
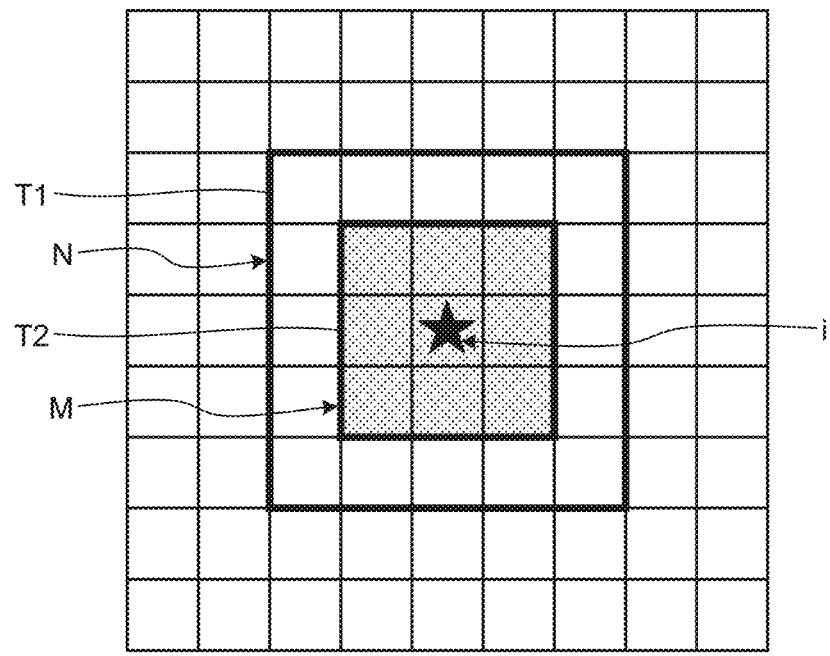
FIG. 12 is a diagram illustrating depth relocation.

FIG. 12 is a diagram illustrating depth relocation. In Formula (4), N represents the number of pixels j (including the target pixel i) involved in the calculation of the depth value of the target pixel i among the pixels in a template image T1. Furthermore, $Y_j$ indicates a depth value of a pixel j (j∈N). In the example of FIG. 12, the depth value of the target pixel i is calculated by the pixels in the range of 3×3 (template image T2 illustrated in FIG. 12) centered on the target pixel i. Accordingly, N is 9 in the example of FIG. 12.

Note that the template image T2 illustrated in FIG. 12 is an image in a smaller range than the template image T1 and is located in the template image T1. The number of pixels of the template image T2 is M. The template image T2 corresponds to a predetermined range in the contribution ratio calculation described above. In the example of FIG. 12, template image T2 is an image having a size and a shape of 3×3, and thus, M is 9. The size and shape of the template image T2 are not limited to the size and shape illustrated in FIG. 12. M does not necessarily have to be 9. Not only the size and shape of the template image T2 but also the size and shape of the template image T1 can be arbitrarily altered. N does not necessarily have to be 9, in a same manner.

In Formula (4), the contribution ratio $R_{j,i}$ indicates the contribution ratio of the pixel i in determination of the depth value $Y_j$ of the pixel j. To facilitate understanding, the contribution ratio $R_{j,i}$ will be described with reference to FIGS. 13A to 13I. FIGS. 13A to 13I are diagrams illustrating the contribution ratio $R_{j,i}$. The correspondence relationship between the value of j and the position of the pixel j does not necessarily have to be the relationships illustrated in FIGS. 13A to 13I.

Figure 13A:
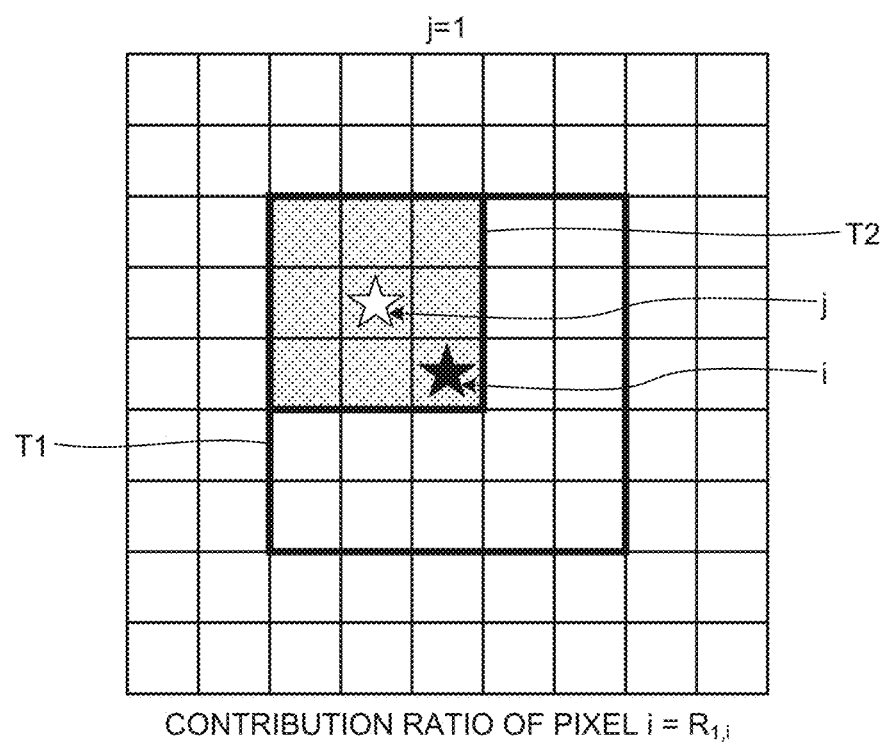
FIG. 13A is a diagram illustrating a contribution ratio.

FIG. 13A is a diagram illustrating a contribution ratio $R_{j,i}$ when j is 1. When j is 1, the depth value $Y_j$ of the pixel j is determined by nine pixels of the template image T2 illustrated in gray in the drawing. In this example, the contribution ratio of the pixel i in the determination of the depth value $Y_j$ is $R_{1,i}$.

Figure 13B:
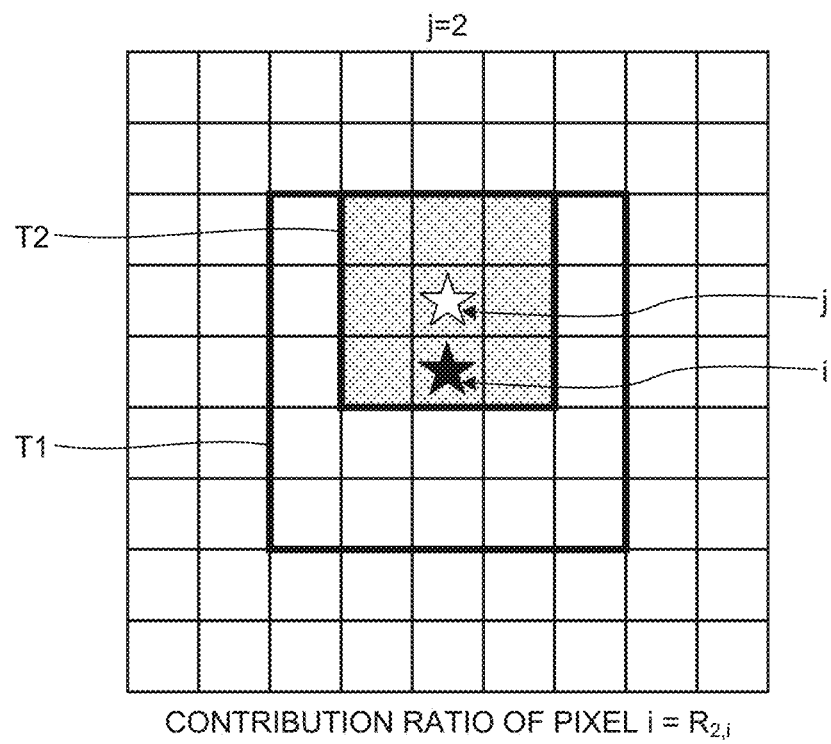
FIG. 13B is a diagram illustrating a contribution ratio.

FIG. 13B is a diagram illustrating a contribution ratio $R_{j,i}$ when j is 2. When j is 2, the depth value $Y_j$ of the pixel j is determined by nine pixels of the template image T2 illustrated in gray in the drawing. In this example, the contribution ratio of the pixel i in the determination of the depth value $Y_j$ is $R_{2,i}$.

Figure 13C:
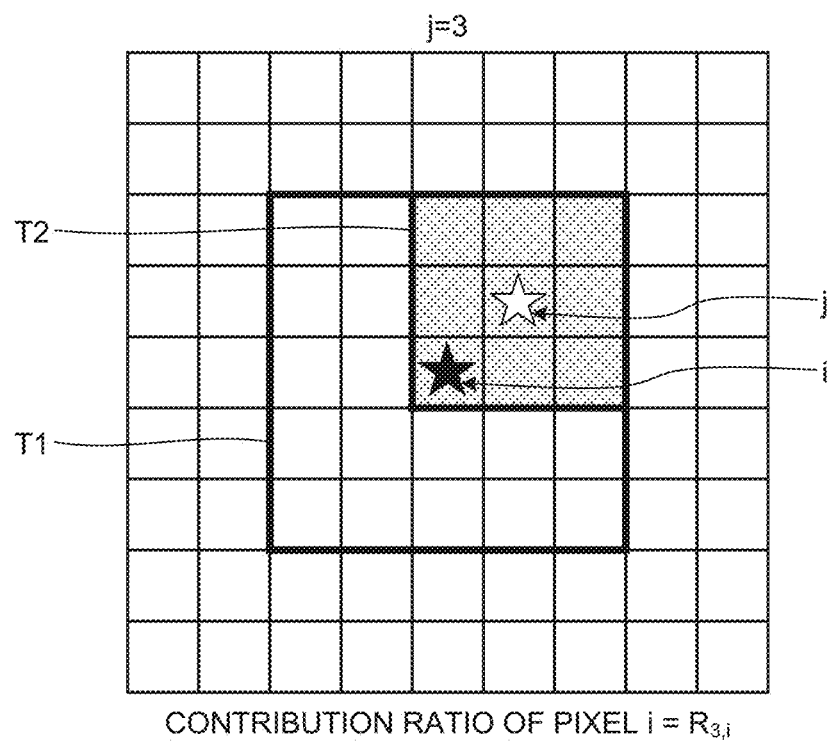
FIG. 13C is a diagram illustrating a contribution ratio.

FIG. 13C is a diagram illustrating a contribution ratio $R_{j,i}$ when j is 3. When j is 3, the depth value $Y_j$ of the pixel j is determined by nine pixels of the template image T2 illustrated in gray in the drawing. In this example, the contribution ratio of the pixel i in the determination of the depth value $Y_j$ is $R_{3,i}$.

Figure 13D:
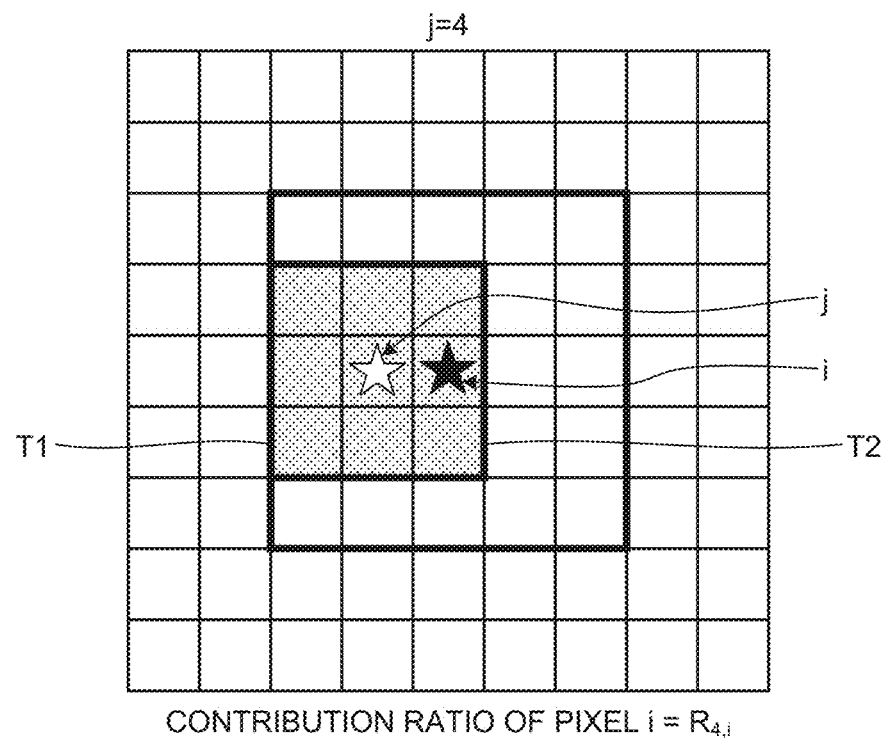
FIG. 13D is a diagram illustrating a contribution ratio.

FIG. 13D is a diagram illustrating a contribution ratio $R_{j,i}$ when j is 4. When j is 4, the depth value $Y_j$ of the pixel j is determined by nine pixels of the template image T2 illustrated in gray in the drawing. In this example, the contribution ratio of the pixel i in the determination of the depth value $Y_j$ is $R_{4,i}$.

Figure 13E:
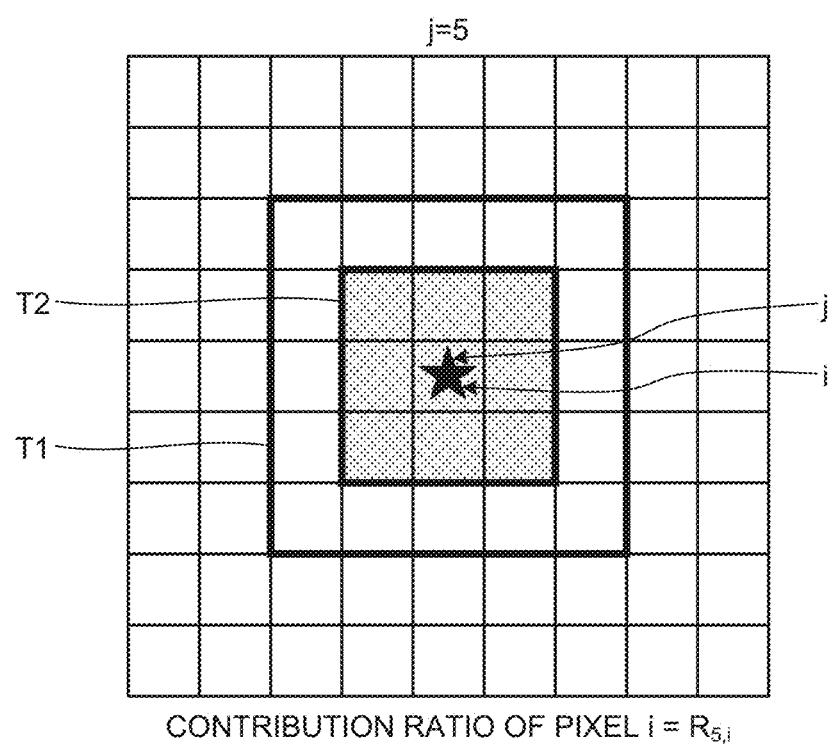
FIG. 13E is a diagram illustrating a contribution ratio.

FIG. 13E is a diagram illustrating a contribution ratio $R_{j,i}$ when j is 5. When j is 5, the depth value $Y_j$ of the pixel j is determined by nine pixels of the template image T2 illustrated in gray in the drawing. In this example, the contribution ratio of the pixel i in the determination of the depth value $Y_j$ is $R_{5,i}$.

Figure 13F:
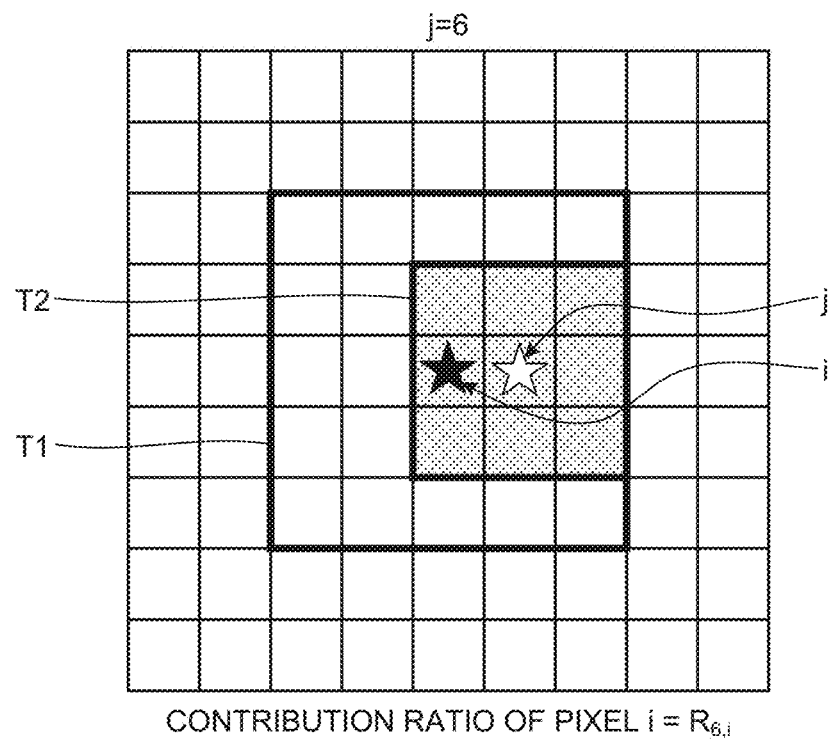
FIG. 13F is a diagram illustrating a contribution ratio.

FIG. 13F is a diagram illustrating a contribution ratio $R_{j,i}$ when j is 6. When j is 6, the depth value $Y_j$ of the pixel j is determined by nine pixels of the template image T2 illustrated in gray in the drawing. In this example, the contribution ratio of the pixel i in the determination of the depth value $Y_j$ is $R_{6,i}$.

Figure 13G:
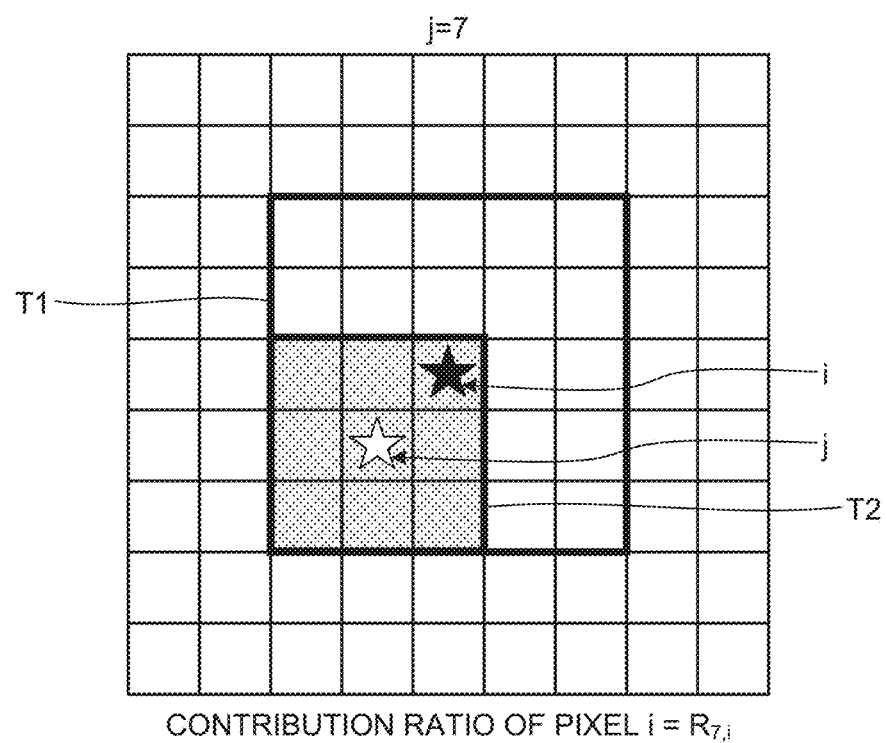
FIG. 13G is a diagram illustrating a contribution ratio.

FIG. 13G is a diagram illustrating a contribution ratio $R_{j,i}$ when j is 7. When j is 7, the depth value $Y_j$ of the pixel j is determined by nine pixels of the template image T2 illustrated in gray in the drawing. In this example, the contribution ratio of the pixel i in the determination of the depth value $Y_j$ is $R_{7,i}$.

Figure 13H:
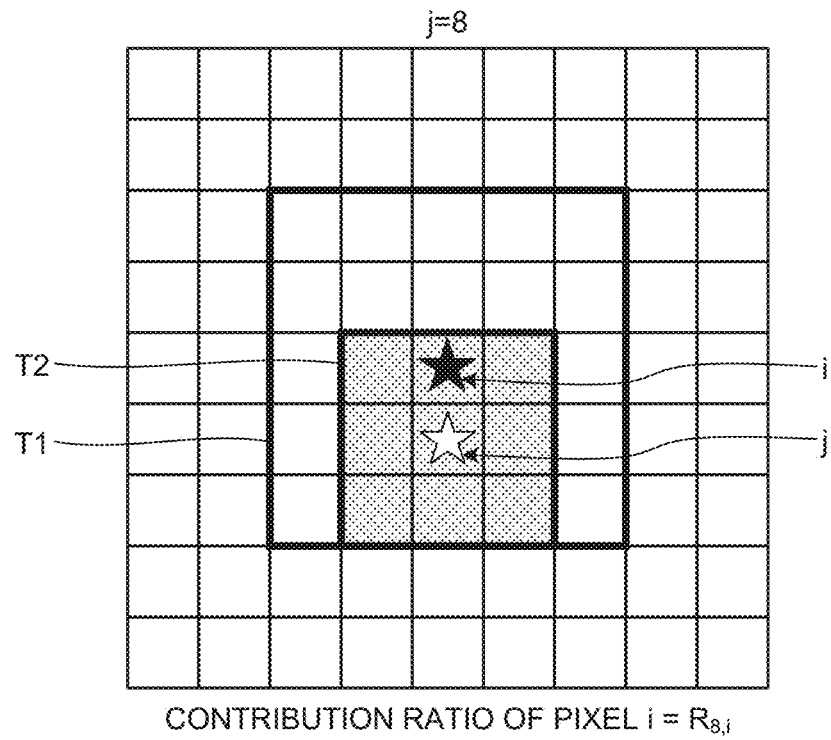
FIG. 13H is a diagram illustrating a contribution ratio.

FIG. 13H is a diagram illustrating a contribution ratio $R_{j,i}$ when j is 8. When j is 8, the depth value $Y_j$ of the pixel j is determined by nine pixels of the template image T2 illustrated in gray in the drawing. In this example, the contribution ratio of the pixel i in the determination of the depth value $Y_j$ is $R_{8,i}$.

Figure 13I:
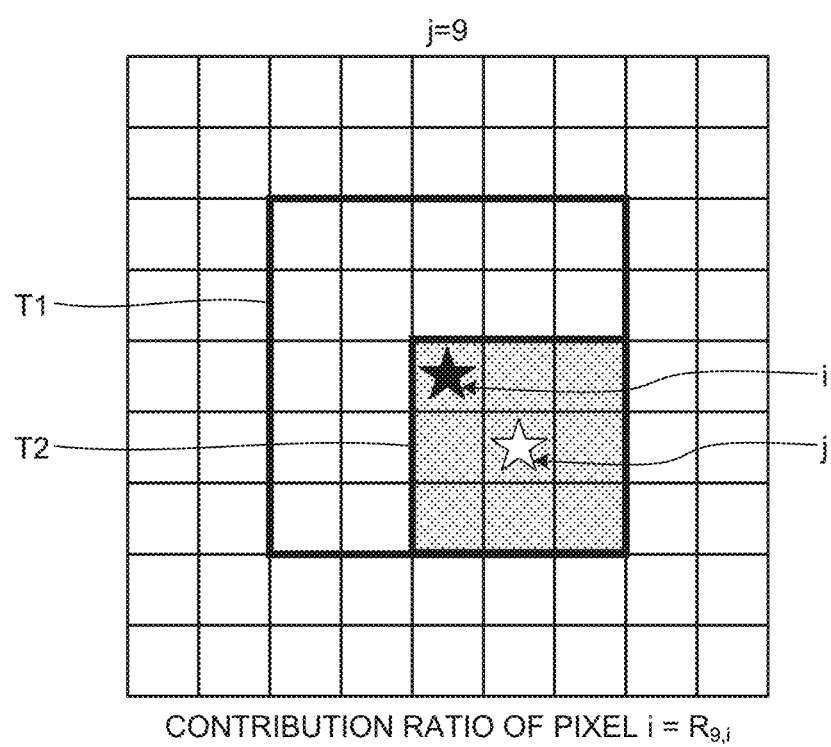
FIG. 13I is a diagram illustrating a contribution ratio.

FIG. 13I is a diagram illustrating a contribution ratio $R_{j,i}$ when j is 9. When j is 9, the depth value $Y_j$ of the pixel j is determined by nine pixels of the template image T2 illustrated in gray in the drawing. In this example, the contribution ratio of the pixel i in the determination of the depth value $Y_j$ is $R_{9,i}$.

The correction unit 143b calculates the corrected depth value $Y_i'$ of the target pixel i based on the contribution ratio $R_{j,i}$. More specifically, as illustrated in the above-described Formula (4), the correction unit 143b calculates the corrected depth value $Y_i'$ of the target pixel i based on a weighted mean of N pixels j (including the target pixel i) with the contribution ratio $R_{j,i}$ as a weight.

Note that the method of calculating the corrected depth value $Y_i'$ of the target pixel i is not limited to the above method. For example, as illustrated in the following Formula (5), the correction unit 143b may calculate the corrected depth value $Y_i'$ of the target pixel i based on a weighted median of N pixels j (including the target pixel i) with the contribution ratio $R_{j,i}$ as a weight.

$$Y_i' = \arg\min_{Y_i' \in Y_k, k \in N} \Sigma_j^N R_{j,i} |Y_j - Y_i'| \qquad (5)$$

After completion of the calculation of the corrected depth values $Y_i'$ for all the target pixels i, the correction unit 143b generates a corrected depth image (depth-relocated image) based on the corrected depth values $Y_i'$. FIG. 14 is a view illustrating a depth image and a corrected depth image obtained by correcting the depth image. The output control unit 144 of the image processing device 10 controls the input/output unit 11 to output the corrected depth image. With completion of the output of the corrected depth image, the correction unit 143b completes the depth correction process.

According to the present embodiment, the image processing device 10 corrects the depth value of the target pixel i based on the contribution ratio of the target pixel i in the depth calculation of each of the plurality of pixels j included in the captured image. With this operation, when the contribution ratio of the target pixel i itself is high (for example, when the target pixel i is in the textured region) in calculating the depth value of the target pixel i, the depth value of the target pixel i will be maintained. In contrast, when the contribution ratio of the target pixel i is low (for example, when the target pixel i is in a flat region near the textured region) in calculating the depth value of the target pixel i, the value will be corrected in a direction of taking over the depth value of another peripheral pixel in which the contribution ratio of the target pixel i is high in calculating the depth value. As a result, the image processing device 10 can generate a highly accurate depth image (corrected depth image) with less pseudo depth.

3. Second Embodiment (Correction Based on Correction Intensity)

Next, an image processing device 10 according to a second embodiment will be described.

In order to control the smoothness of a phase-corrected image in accordance with the application, a method of performing region-basis control of the correction intensity by the relocation according to the image structure is proposed. While the proposed relocation technology has a denoise effect due to the relocation in a non-subject boundary region in addition to the phase correction effect in a subject boundary region, there is an adverse effect that the depth image is blurred by this smoothing effect. For example, although the pseudo depth can be reduced by using the method illustrated in the first embodiment, the corrected depth image to be output would be a blurred image as a whole as can be seen from FIG. 14. To handle this issue, a method of suppressing the above-described blur of the depth by limiting the process to the subject region considered to have a phase recovery effect is proposed.

For example, in the second embodiment, the image processing device 10 calculates the correction intensity (correction intensity image) and controls the correction of the corrected depth value using the calculated correction intensity (correction intensity image) to reduce the output blurring. Here, the correction intensity image is an image of the correction intensity of each of pixels. The correction intensity is, for example, a value indicating a composition weight for each of pixels when combining the depth image and the corrected depth image (depth-relocated image). The correction intensity is high at a portion (pixel) where the original depth image is more preferable, and the correction intensity is low at a portion (pixel) where the corrected depth image is more preferable. The image processing device 10 according to the second embodiment reduces output blurring by controlling composition of the depth image and the corrected depth image by using the correction intensity. The correction intensity will be described in detail below.

3-1. Configuration of Image Processing Device

First, a configuration of the image processing device 10 according to the second embodiment will be described. The configuration of the image processing device 10 of the second embodiment is similar to that of the image processing device 10 of the first embodiment illustrated in FIGS. 7 and 8, with a partial difference in the configuration of the depth correction unit 143 from that of the depth correction unit 143 of the first embodiment.

Similarly to the depth correction unit 143 of the first embodiment, the depth correction unit 143 of the second embodiment corrects the depth image generated by the parallax calculation unit 142 and generates a corrected depth image. At this time, the depth correction unit 143 corrects the depth value calculated by the parallax calculation unit 142, thereby calculating the corrected depth value. The depth correction unit 143 then generates a corrected depth image (depth-relocated image) based on the corrected depth value. Furthermore, the depth correction unit 143 updates the corrected depth image (depth-relocated image) based on the correction intensity to acquire an updated corrected depth image. The "updated corrected depth image" is a type of corrected depth image.

Figure 15:
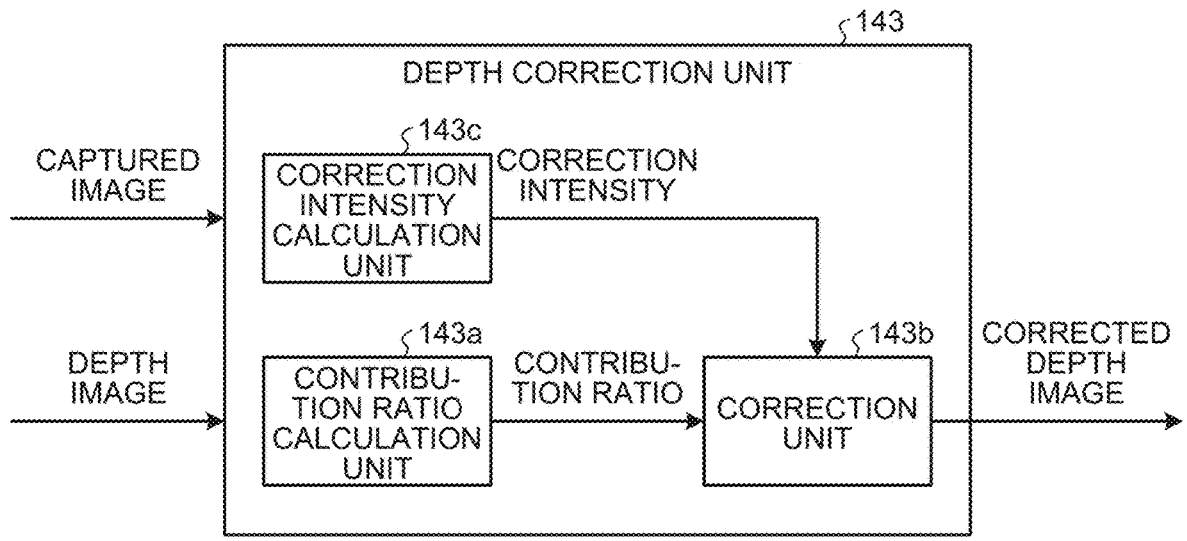
FIG. 15 is a diagram illustrating a configuration example of a depth correction unit.

FIG. 15 is a diagram illustrating a configuration example of the depth correction unit 143. The depth correction unit 143 includes a contribution ratio calculation unit 143a, a correction unit 143b, and a correction intensity calculation unit 143c. The correction intensity calculation unit 143c acquires the captured image from the storage unit 13 and acquires a depth image corresponding to the captured image. The depth image may be an image generated by the parallax calculation unit 142 or may be an image acquired by the acquisition unit 141 from an external device via the input/output unit 11. The correction intensity calculation unit 143c calculates the correction intensity based on the captured image. A method of calculating the correction intensity will be described in detail below.

The contribution ratio calculation unit 143a then calculates the contribution ratio of the target pixel (or the target region) in the depth calculation of each of the plurality of pixels (or plurality of regions) included in the input image (captured image). Subsequently, the correction unit 143b corrects the depth value of the target pixel (or the target region) based on the contribution ratio calculated by the contribution ratio calculation unit 143a. Then, the correction unit 143b generates a corrected depth image (depth-relocated image) based on the corrected depth value. Furthermore, the correction unit 143b updates the corrected depth image (depth-relocated image) based on the correction intensity to acquire an updated corrected depth image.

The configuration other than the depth correction unit 143 is similar to that of the image processing device 10 of the first embodiment.

3-2. Operations of Image Processing Device

Next, operations of the image processing device 10 according to the second embodiment will be described.

Figure 16:
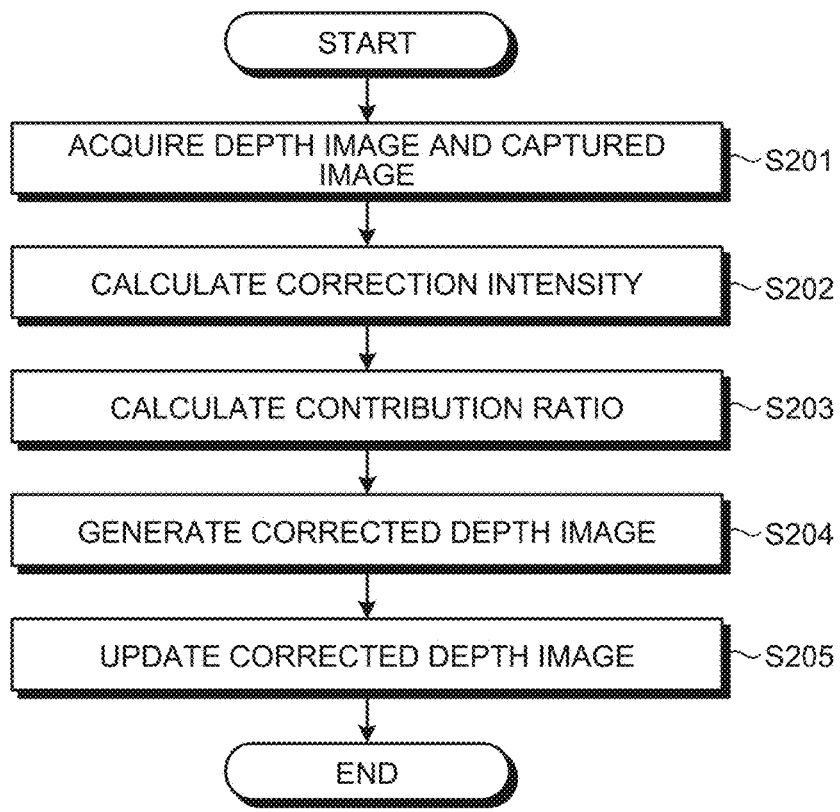
FIG. 16 is a flowchart illustrating a depth correction process according to a second embodiment.

The image processing device 10 executes a depth correction process of correcting a depth image. FIG. 16 is a flowchart illustrating the depth correction process according to the second embodiment. The depth correction process illustrated in FIG. 16 is executed by the depth correction unit 143 of the image processing device 10.

Figure 17:
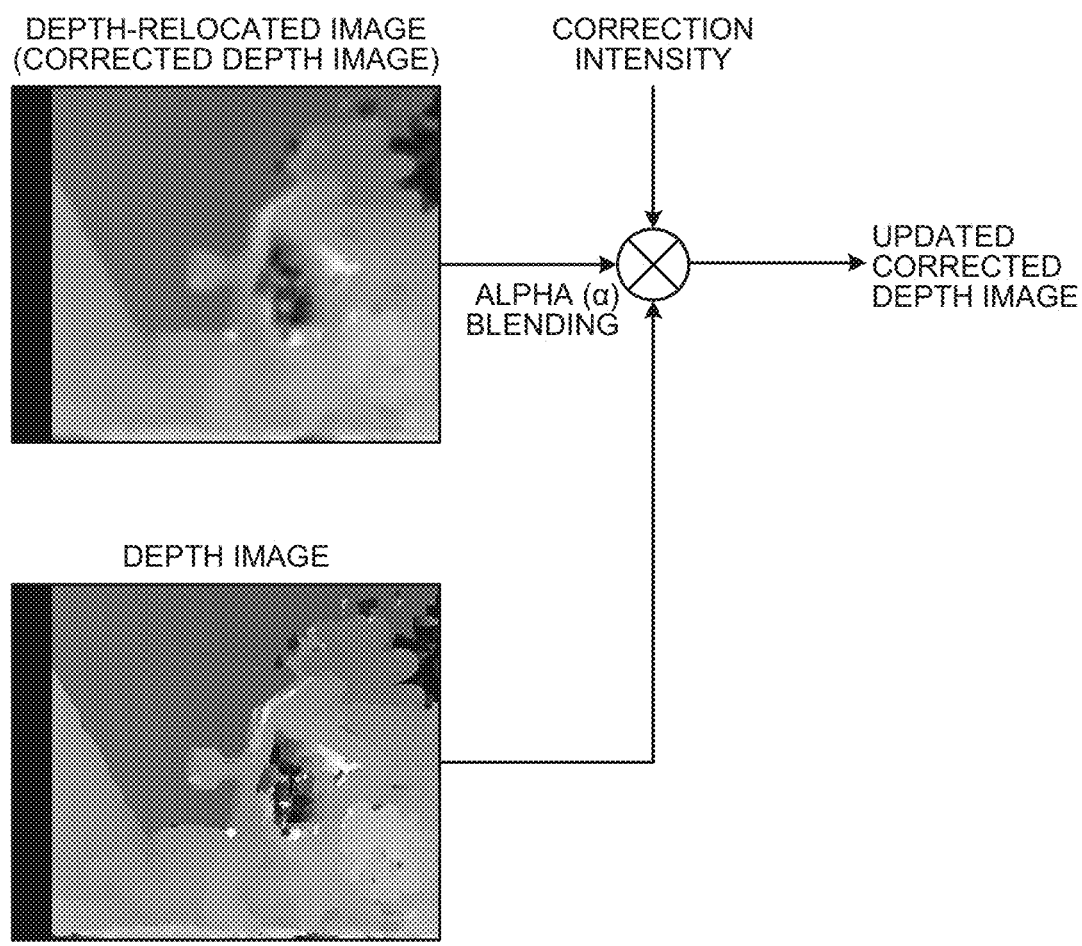
FIG. 17 is a diagram illustrating a state in which a correction unit updates a corrected depth image.

As described above, the depth correction unit 143 includes the correction intensity calculation unit 143c that calculates the correction intensity. The correction unit 143b of the depth correction unit 143 updates the corrected depth image (depth-relocated image) based on the correction intensity calculated by the correction intensity calculation unit 143c, thereby acquiring an updated corrected depth image. FIG. 17 is a diagram illustrating a state in which the correction unit 143b updates a corrected depth image. In the example of FIG. 17, the correction unit 143b applies alpha blending (α-blending) on the depth image and the depth-relocated image by using the correction intensity, thereby acquiring an updated corrected depth image (phase-corrected image). In the present embodiment, the correction intensity is a coefficient to be used in the α-blending of the depth image and the depth-relocated image.

Hereinafter, the depth correction process of the second embodiment will be described with reference to the flowchart of FIG. 16. For example, after the depth image and the captured image have been input, the depth correction unit 143 starts the depth correction process. Note that a part or all of the processes described below may be implemented by software (program) or by a hardware circuit. In the following description, an exemplary case of the stereo image processing is illustrated, the application of the present embodiment is not limited to the stereo image processing.

First, the correction intensity calculation unit 143c of the depth correction unit 143 acquires a depth image and a captured image (step S201). The captured image may include a standard image and a reference image.

The correction intensity calculation unit 143c then calculates correction intensity $W_i$ of the target pixel i based on the captured image (step S202). For example, the correction intensity calculation unit 143c calculates the correction intensity $W_i$ based on the feature amount of the target pixel i. An example of the feature amount is edge intensity. For example, the correction intensity $W_i$ is calculated based on the edge intensity of the target pixel i. For example, the correction intensity calculation unit 143c calculates the correction intensity $W_i$ by the following Formula (6).

$$W_i = 1.0 - I_i' \qquad (6)$$

Here, $I_i'$ is edge intensity obtained by normalizing edge intensity $I_i$ of the target pixel i to a range of 0 to 1. The edge intensity $I_i$ to be the calculation source of the edge intensity $I_i'$ may be, for example, the intensity calculated using a Sobel filter, a Prewitt filter, a first order differential filter, a Laplacian filter, or a Canny method, or may be the intensity calculated in a direction perpendicular to the stereo epipolar line. The method of calculating the edge intensity $I_i$ is not limited thereto, and various known methods can be adopted. Needless to say, the correction intensity calculation unit 143c may calculate the edge intensity $I_i$ using a unique edge calculation method.

The correction intensity $W_i$ illustrated in Formula (6) is a small value when the target pixel i is on the edge, and is a large value when the target pixel i is at a position away from the edge. By combining the depth image and the corrected depth image (depth-relocated image) using the correction intensity $W_i$, the image processing device 10 can obtain the corrected depth image as a sharper image. The correction intensity calculation unit 143c calculates the correction intensity $W_i$ for all the target pixels i. At this time, the correction intensity image may be generated based on the calculated correction intensity. The correction intensity image is an image of the correction intensity of each of pixels.

Subsequently, the contribution ratio calculation unit 143a calculates the contribution ratio of the target pixel in the depth calculation of each of the plurality of pixels included in the captured image (step S203). Next, the correction unit 143b calculates corrected depth values for all the target pixels i based on the contribution ratio and the depth image. The correction unit 143b then generates a corrected depth image (depth-relocated image) based on the corrected depth value (step S204). The processes of steps S203 and S204 may be the same as the processes of steps S102 and S103 respectively in the first embodiment.

Next, the correction unit 143b updates the corrected depth image using the correction intensity image and the depth image (step S205). For example, the correction unit 143b updates the corrected depth image by applying α-blending on the depth image and the corrected depth image by using the correction intensity image. Here, when the corrected depth value of the target pixel i in the corrected depth image is $Y_i'$, the corrected depth value $Y_i''$, which is an update result of the corrected depth value $Y_i'$, can be calculated by the following Formula (7), for example.

$$Y_i'' = W_i Y_i' + (1.0 - W_i) Y_i \qquad (7)$$

After completion of the calculation of the corrected depth values $Y_i''$ for all the target pixels i, the correction unit 143b updates the corrected depth image based on the corrected depth value $Y_i''$. The output control unit 144 of the image processing device 10 controls the input/output unit 11 to output the updated corrected depth image. With completion of the output of the updated corrected depth image, the correction unit 143b completes the depth correction process.

Note that the correction unit 143b may once expand the corrected depth image (depth-relocated image) generated in step S204 to the buffer and then blend the corrected depth image with the depth image, or may directly apply the corrected depth value $Y_i''$ to the depth image without expanding the corrected depth image (depth-relocated image) to the buffer.

According to the present embodiment, since the image processing device 10 updates the corrected depth image (depth-relocated image) based on the correction intensity, it is possible to generate a sharp corrected depth image.

4. Third Embodiment (Calculation of Correction Intensity Based on Unevenness)

Next, an image processing device 10 according to a third embodiment will be described.

By using the method described in the first embodiment, pseudo depth can be reduced. However, as can be seen in FIG. 14, application of the method described in the first embodiment might produce an output corrected depth image as a blurred image as a whole. In addition, there may be a phenomenon in which a part of the foreground depth is scraped.

Figure 18:
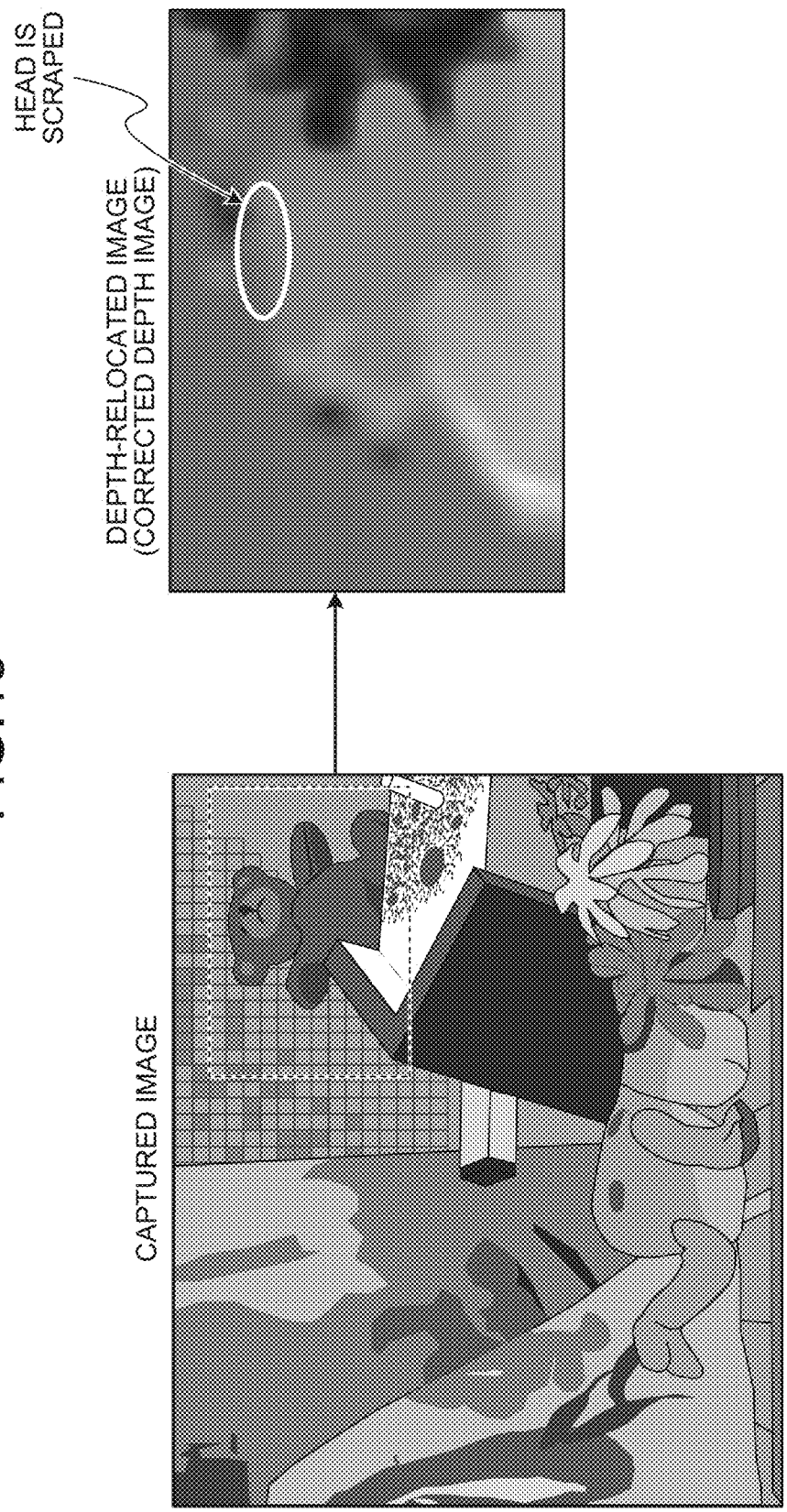
FIG. 18 is a diagram illustrating a problem occurring in a corrected depth image.

FIG. 18 is a diagram illustrating a problem occurring in a corrected depth image. As illustrated in FIG. 18, it can be seen that a part of the head of the stuffed bear has been scraped. This is considered to be caused by invasion of the background depth (false) due to the strained foreground depth (true) at a double-edge. The double-edge refers to a state in which different edged have invaded the template image T2, for example. An example of this is a state in which two edges, namely upper and lower edges or left and right edges, run on the template image T2.

Therefore, in the third embodiment, the image processing device 10 calculates the correction intensity $W_i$ based on the deviation (unevenness) of the feature amount in the template image T2. At this time, the image processing device 10 heightens the correction intensity $W_i$ when the feature amount in the template image T2 has a deviation (for example, when there is only one edge running in the template image T2), and lowers the correction intensity $W_i$ when the feature amount in the template image T2 has no deviation (for example, when a plurality of edges runs in the template image T2 or there is no edge in the template image T2). The image processing device 10 of the third embodiment controls the composition of the depth image and the corrected depth image using the correction intensity calculated in this manner, thereby reducing an error at the double-edge.

4-1. Configuration of Image Processing Device

First, a configuration of an image processing device 10 according to the third embodiment will be described. The configuration of the image processing device 10 of the third embodiment is similar to that of the image processing device 10 of the second embodiment, with a partial difference in the function of the depth correction unit 143 from that of the depth correction unit 143 of the second embodiment.

Similarly to the depth correction unit 143 of the second embodiment illustrated in FIG. 15, the depth correction unit 143 of the third embodiment includes a contribution ratio calculation unit 143a, a correction unit 143b, and a correction intensity calculation unit 143c. The correction intensity calculation unit 143c acquires the captured image from the storage unit 13 and acquires a depth image corresponding to the captured image. The depth image may be an image generated by the parallax calculation unit 142 or may be an image acquired by the acquisition unit 141 from an external device via the input/output unit 11. The correction intensity calculation unit 143c calculates the correction intensity based on the captured image. A method of calculating the correction intensity will be described in detail below.

The contribution ratio calculation unit 143a then calculates the contribution ratio of the target pixel (or the target region) in the depth calculation of each of the plurality of pixels (or plurality of regions) included in the input image (captured image). Subsequently, the correction unit 143b corrects the depth value of the target pixel (or the target region) based on the contribution ratio calculated by the contribution ratio calculation unit 143a. Then, the correction unit 143b generates a depth-relocated image (corrected depth image) based on the corrected depth value. Furthermore, the correction unit 143b updates the depth-relocated image (corrected depth image) based on the correction intensity, thereby generating a phase-corrected image (updated corrected depth image). The phase-corrected image is a type of corrected depth image.

The configuration other than the depth correction unit 143 is similar to that of the image processing device 10 of the second embodiment.

4-2. Operations of Image Processing Device

Next, operations of the image processing device 10 according to the third embodiment will be described.

Figure 19:
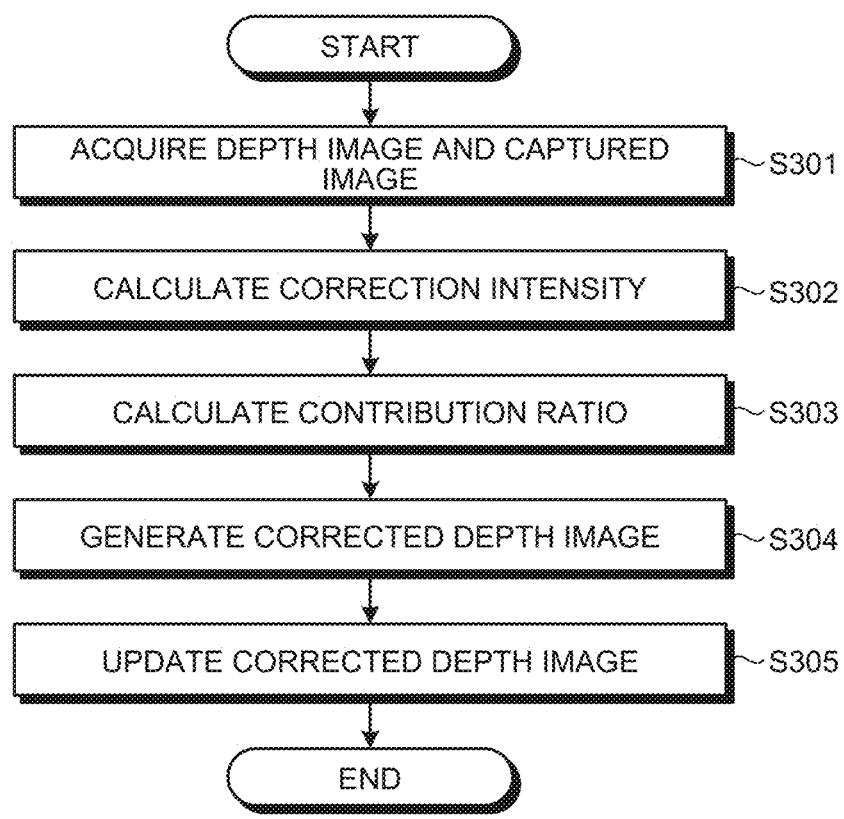
FIG. 19 is a flowchart illustrating a depth correction process according to a third embodiment.

The image processing device 10 executes a depth correction process of correcting a depth image. FIG. 19 is a flowchart illustrating the depth correction process according to the third embodiment. The depth correction process illustrated in FIG. 19 is executed by the depth correction unit 143 of the image processing device 10.

As described above, the depth correction unit 143 includes the correction intensity calculation unit 143c that calculates the correction intensity. The correction unit 143b of the depth correction unit 143 updates the depth-relocated image (corrected depth image) based on the correction intensity calculated by the correction intensity calculation unit 143c, thereby generating the phase-corrected image (updated corrected depth image).

Figure 20:
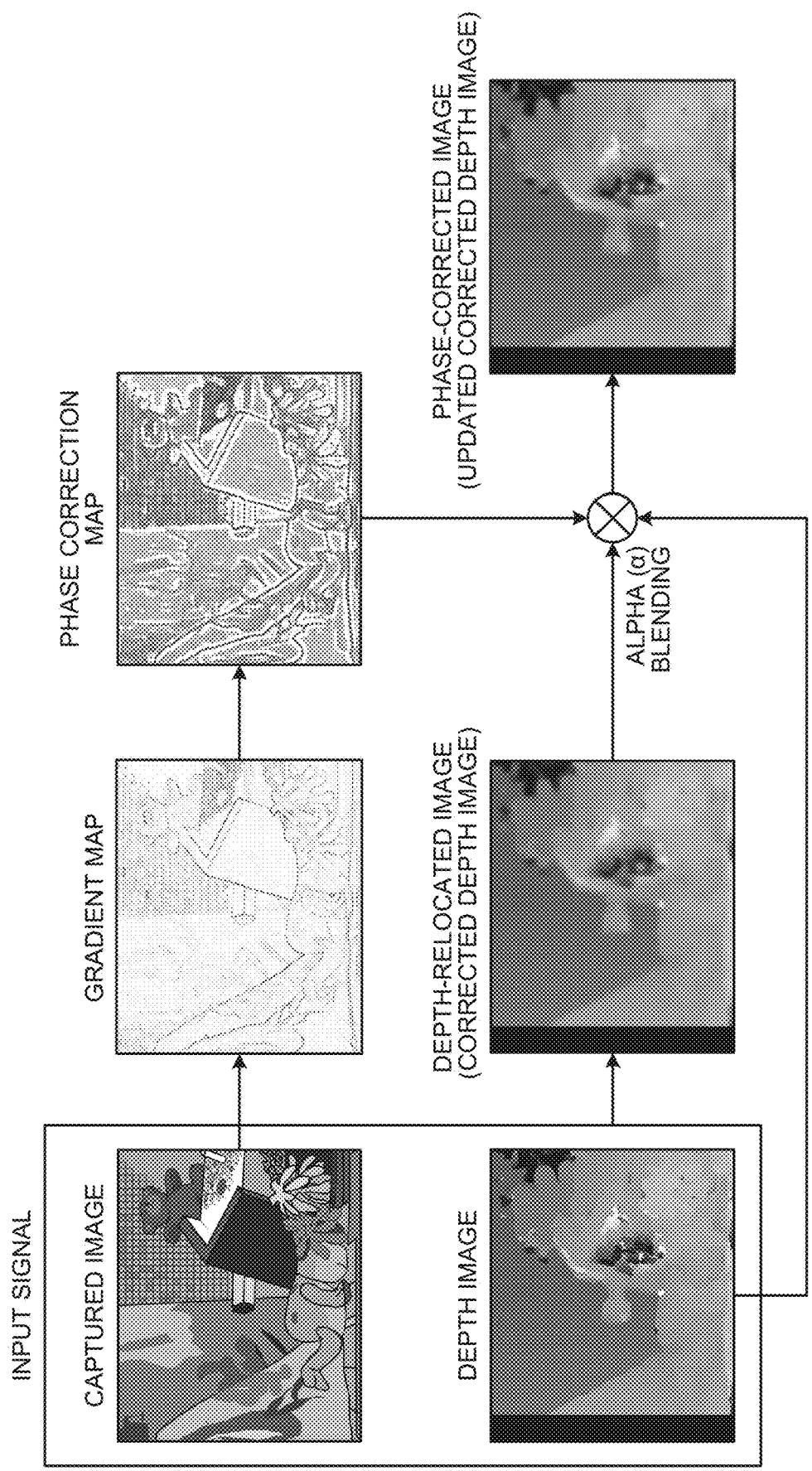
FIG. 20 is a diagram illustrating a state in which a correction unit generates a phase-corrected image.

FIG. 20 is a diagram illustrating a state in which the correction unit 143b generates a phase-corrected image. In the example of FIG. 20, the correction unit 143b generates a phase correction map based on a gradient map (edge image) of the captured image. In the third embodiment, the phase correction map corresponds to a correction intensity image. The correction unit 143b generates a phase-corrected image by applying α-blending on the depth image and the depth-relocated image by using the correction intensity (correction intensity image). In the present embodiment, the correction intensity is a coefficient to be used in the α-blending of the depth image and the depth-relocated image.

Hereinafter, the depth correction process of the third embodiment will be described with reference to the flowchart of FIG. 19. For example, after the depth image and the captured image have been input, the depth correction unit 143 starts the depth correction process. Note that a part or all of the processes described below may be implemented by software (program) or by a hardware circuit. In the following description, an exemplary case of the stereo image processing is illustrated, the application of the present embodiment is not limited to the stereo image processing.

First, the correction intensity calculation unit 143c of the depth correction unit 143 acquires a depth image and a captured image (step S301). The captured image may include a standard image and a reference image.

The correction intensity calculation unit 143c then calculates the correction intensity $W_i$ of the target pixel i based on the captured image (step S302). For example, the correction intensity calculation unit 143c calculates the correction intensity $W_i$ based on "the feature amount of the target pixel i" and the "deviation (unevenness) of the feature amount in the template image T2 used for the depth calculation of the target pixel i". An example of the "feature amount of the target pixel i" is edge intensity $I_i$ of the target pixel i. In addition, the "deviation (unevenness) of the feature amount in the template image T2 used for the depth calculation of the target pixel i" is an edge deviation $D_i$ in the template image T2 used for the depth calculation of the target pixel i. The edge deviation $D_i$ can be calculated by the following Formula (8), for example.

$$D_i = \sqrt{\left(\frac{\sum_j^M R_{i,j} x_j}{M}\right)^2 + \left(\frac{\sum_j^M R_{i,j} y_j}{M}\right)^2} \tag{8}$$

Here, M is similar to M described in the first embodiment. That is, M is the number of pixels of the template image T2. In the example of FIG. 12, M is 9.

In addition, $(x_j, y_j)$ indicates a relative position of the pixel j in the template image T2 of the target pixel i with the target pixel i as a center. Furthermore, the contribution ratio $R_{i,j}$ indicates the contribution ratio of the pixel j in the determination of the depth value $Y_i$ of the pixel i. To facilitate understanding, the contribution ratio $R_{i,j}$ will be described with reference to FIGS. 21A to 21I. FIGS. 21A to 21I are diagrams illustrating the contribution ratio $R_{i,j}$. Note that the correspondence relationship between the value of j and the position of the pixel j does not necessarily have to be the relationship illustrated in FIGS. 21A to 21I.

Figure 21A:
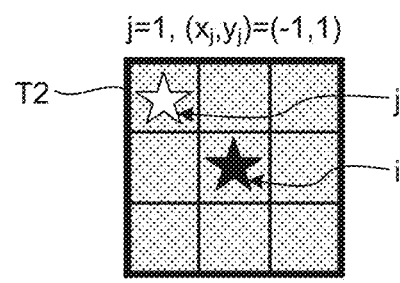
FIG. 21A is a diagram illustrating a contribution ratio.

FIG. 21A is a diagram illustrating a contribution ratio $R_{i,j}$ when j is 1. In the example of FIG. 21A, the depth value $Y_i$ of the pixel i is determined by nine pixels of the template image T2 illustrated in gray in the drawing. In this example, the relative position $(x_j, y_j)$ of the pixel j is (−1,1), and the contribution ratio of the pixel j in the determination of the depth value $Y_i$ is $R_{i,1}$.

Figure 21B:
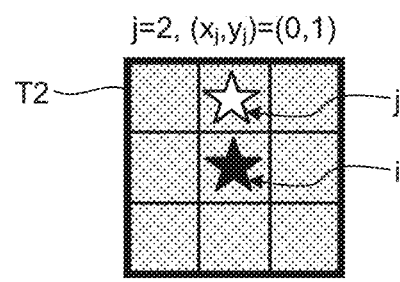
FIG. 21B is a diagram illustrating a contribution ratio.

FIG. 21B is a diagram illustrating the contribution ratio $R_{i,j}$ when j is 2. In the example of FIG. 21B, the depth value $Y_i$ of the pixel i is determined by nine pixels of the template image T2 illustrated in gray in the drawing. In this example, the relative position $(x_j, y_j)$ of the pixel j is (0,1), and the contribution ratio of the pixel j in the determination of the depth value $Y_i$ is $R_{i,2}$.

Figure 21C:
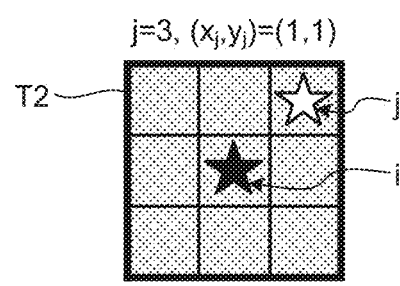
FIG. 21C is a diagram illustrating a contribution ratio.

FIG. 21C is a diagram illustrating the contribution ratio $R_{i,j}$ when j is 3. In the example of FIG. 21C, the depth value $Y_i$ of the pixel i is determined by nine pixels of the template image T2 illustrated in gray in the drawing. In this example, the relative position $(x_j, y_j)$ of the pixel j is (1,1), and the contribution ratio of the pixel j in the determination of the depth value $Y_i$ is $R_{i,3}$.

Figure 21D:
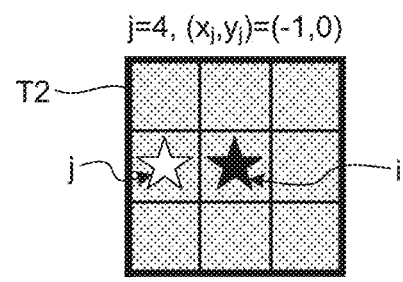
FIG. 21D is a diagram illustrating a contribution ratio.

FIG. 21D is a diagram illustrating the contribution ratio $R_{i,j}$ when j is 4. In the example of FIG. 21D, the depth value $Y_i$ of the pixel i is determined by nine pixels of the template image T2 illustrated in gray in the drawing. In this example, the relative position $(x_j, y_j)$ of the pixel j is (−1,0), and the contribution ratio of the pixel j in the determination of the depth value $Y_i$ is $R_{i,4}$.

Figure 21E:
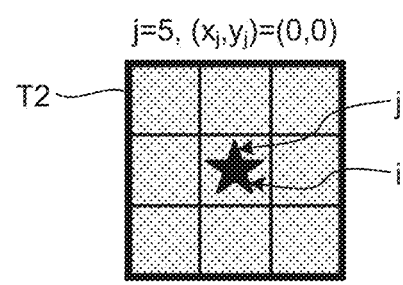
FIG. 21E is a diagram illustrating a contribution ratio.

FIG. 21E is a diagram illustrating the contribution ratio $R_{i,j}$ when j is 5. In the example of FIG. 21E, the depth value $Y_i$ of the pixel i is determined by nine pixels of the template image T2 illustrated in gray in the drawing. In this example, the relative position $(x_j, y_j)$ of the pixel j is (0,0), and the contribution ratio of the pixel j in the determination of the depth value $Y_i$ is $R_{i,5}$.

Figure 21F:
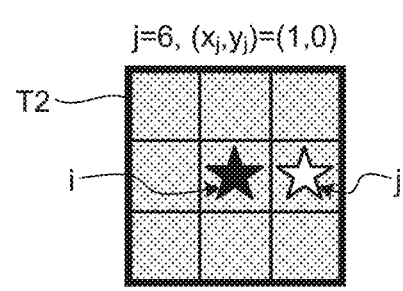
FIG. 21F is a diagram illustrating a contribution ratio.

FIG. 21F is a diagram illustrating the contribution ratio $R_{i,j}$ when j is 6. In the example of FIG. 21F, the depth value $Y_i$ of the pixel i is determined by nine pixels of the template image T2 illustrated in gray in the drawing. In this example, the relative position $(x_j, y_j)$ of the pixel j is (1,0), and the contribution ratio of the pixel j in the determination of the depth value $Y_i$ is $R_{i,6}$.

Figure 21G:
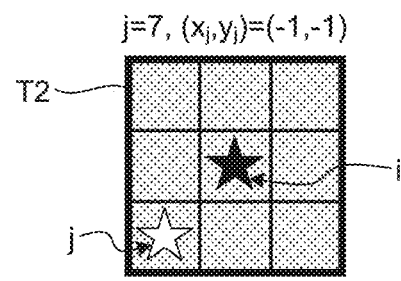
FIG. 21G is a diagram illustrating a contribution ratio.

FIG. 21G is a diagram illustrating the contribution ratio $R_{i,j}$ when j is 7. In the example of FIG. 21G, the depth value $Y_i$ of the pixel i is determined by nine pixels of the template image T2 illustrated in gray in the drawing. In this example, the relative position $(x_j, y_j)$ of the pixel j is (−1,−1), and the contribution ratio of the pixel j in the determination of the depth value $Y_i$ is $R_{i,7}$.

Figure 21H:
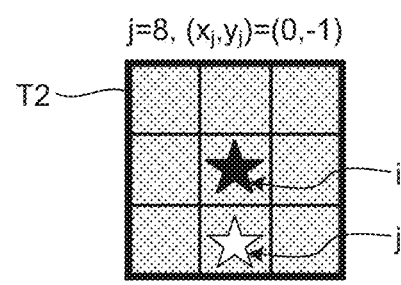
FIG. 21H is a diagram illustrating a contribution ratio.

FIG. 21H is a diagram illustrating the contribution ratio $R_{i,j}$ when j is 8. In the example of FIG. 21H, the depth value $Y_i$ of the pixel i is determined by nine pixels of the template image T2 illustrated in gray in the drawing. In this example, the relative position $(x_j, y_j)$ of the pixel j is (0,−1), and the contribution ratio of the pixel j in the determination of the depth value $Y_i$ is $R_{i,8}$.

Figure 21I:
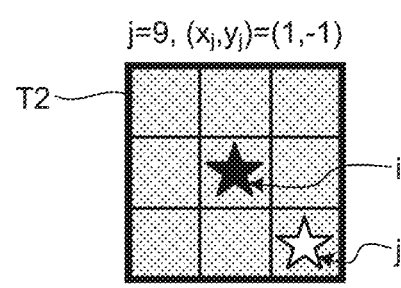
FIG. 21I is a diagram illustrating a contribution ratio.

FIG. 21I is a diagram illustrating the contribution ratio $R_{i,j}$ when j is 9. In the example of FIG. 21I, the depth value $Y_i$ of the pixel i is determined by nine pixels of the template image T2 illustrated in gray in the drawing. In this example, the relative position $(x_j, y_j)$ of the pixel j is (1,−1), and the contribution ratio of the pixel j in the determination of the depth value $Y_i$ is $R_{i,9}$.

The correction intensity calculation unit 143c calculates the correction intensity $W_i$ based on the edge intensity of the target pixel i and the edge deviation $D_i$. For example, the correction intensity calculation unit 143c calculates the correction intensity $W_i$ by the following Formula (9).

$$W_i = (1.0 - I_i')D_i \qquad (9)$$

Here, $I_i'$ is edge intensity obtained by normalizing edge intensity $I_i$ of the target pixel i to a range of 0 to 1. The edge intensity $I_i$ to be the calculation source of the edge intensity $I_i'$ may be, for example, the intensity calculated using a Sobel filter, a Prewitt filter, a first order differential filter, a Laplacian filter, or a Canny method, or may be the intensity calculated in a direction perpendicular to the stereo epipolar line. The method of calculating the edge intensity $I_i$ is not limited thereto, and various known methods can be adopted. Needless to say, the correction intensity calculation unit 143c may calculate the edge intensity $I_i$ using a unique edge calculation method.

The correction intensity $W_i$ expressed by Formula (9) is a large value when the feature amount in the template image T2 has a deviation in determination of the depth value $Y_i$ of the target pixel i, and is a small value when the feature amount in the template image T2 has no deviation (for example, in the case of double-edge or no-edge). By combining the depth image and the corrected depth image (depth-relocated image) using the correction intensity $W_i$, the image processing device 10 can obtain a highly accurate corrected depth image with less errors. The correction intensity calculation unit 143c calculates the correction intensity $W_i$ for all the target pixels i. At this time, the correction intensity image may be generated based on the calculated correction intensity.

Subsequently, the contribution ratio calculation unit 143a calculates the contribution ratio of the target pixel in the depth calculation of each of the plurality of pixels included in the captured image (step S303). Next, the correction unit 143b calculates corrected depth values for all the target pixels i based on the contribution ratio and the depth image. The correction unit 143b then generates a corrected depth image (depth-relocated image) based on the corrected depth value (step S304). The processes of steps S203 and S204 may be the same as the processes of steps S102 and S103 respectively in the first embodiment.

Next, the correction unit 143b updates the corrected depth image using the correction intensity image and the depth image (step S305). For example, the correction unit 143b updates the corrected depth image by applying α-blending on the depth image and the corrected depth image by using the correction intensity image. Here, when the corrected depth value of the target pixel i in the corrected depth image is $Y_i'$, the corrected depth value $Y_i''$, which is an update result of the corrected depth value $Y_i'$, can be calculated by Formula (7) described above.

After completion of the calculation of the corrected depth values $Y_i''$ for all the target pixels i, the correction unit 143b updates the corrected depth image based on the corrected depth value $Y_i''$. FIG. 22 is a diagram illustrating a depth image and a phase-corrected image obtained by correcting the depth image. The output control unit 144 of the image processing device 10 controls the input/output unit 11 to output the phase-corrected image. With completion of the output of the phase-corrected image, the correction unit 143b completes the depth correction process.

Note that the correction unit 143b may once expand the corrected depth image (depth-relocated image) generated in step S304 to the buffer and then blend the corrected depth image with the depth image, or may directly apply the corrected depth value $Y_i''$ to the depth image without expanding the corrected depth image (depth-relocated image) to the buffer.

Figure 23:
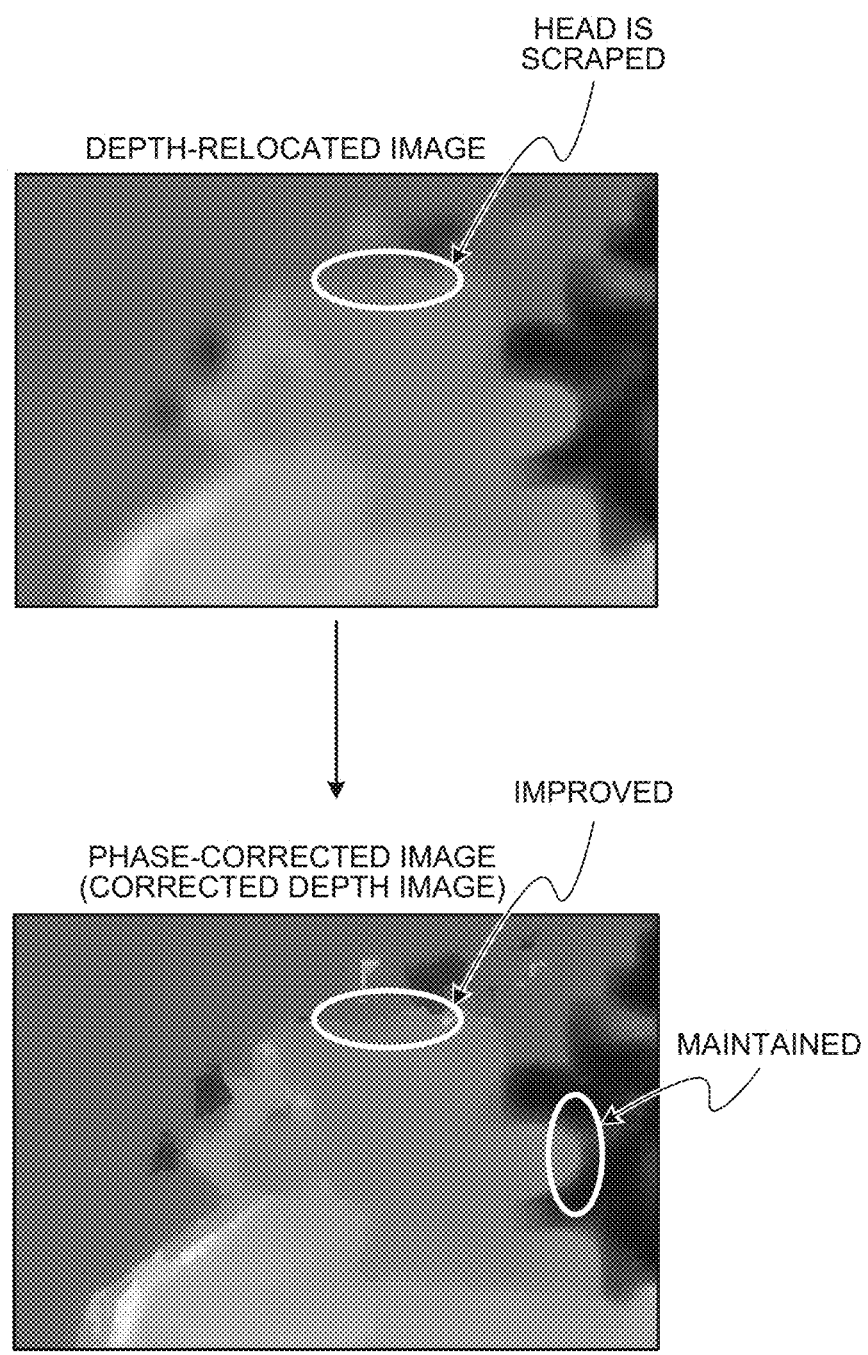
FIG. 23 is a diagram illustrating a part of a depth-relocated image and a part of a phase-corrected image corresponding to the part.

According to the present embodiment, the image processing device 10 can generate a corrected depth image with less errors due to double-edge, or the like. FIG. 23 is a diagram illustrating a part of a depth-relocated image and a part of a phase-corrected image corresponding to the part. As can be seen from FIG. 23, a part of the head, which has been scraped in the depth-relocated image, is now improved in the phase-corrected image. Moreover, it is obvious that the pseudo depth has not occurred in the left hand portion, indicating that the pseudo depth reduction effect is maintained. In addition, it is observed that the image is sharper and the output blurring has been reduced.

5. Modification

Each of the above-described embodiments is an example, and various modifications and applications are possible.

For example, in each of the above-described embodiments, the image processing device 10 generates a depth image (corrected depth image) using a still image as an input. Alternatively, the image processing device 10 may generate a depth image (corrected depth image) using a moving image as an input.

In this case, the image processing device 10 may calculate the correction intensity $W_i$ of the target pixel i described in the second and third embodiments by further using a depth edge map E calculated using the target image and its preceding and succeeding frame images. The calculation of the depth edge map E can be done by using the method of Aleksander Holynski and Johannes Kopf, Fast depth densification for occlusion-aware augmented reality, ACM Transactions on Graphics (TOG), Vol. 37, 2018, for example. In this case, the image processing device 10 can calculate the depth edge map E by calculating an optical flow between the target image and the preceding and succeeding frames and adding gradient intensity of the calculated optical flow. Additional use of the depth edge map E enables efficient selection of only an edge having a depth difference from among edges of an image, making it possible to apply the technique selectively to an image region targeted for the effect of the present embodiment, leading to improvement of correction accuracy.

In each of the above-described embodiments, the contribution ratio calculation unit 143a calculates the contribution ratio based on the feature amount such as the edge intensity. Alternatively, the contribution ratio calculation unit 143a may calculate the contribution ratio based on the sum of the feature amounts of the plurality of pixels of the template image T2 including the target pixel i.

Although the contribution ratio calculation unit 143a in each of the above-described embodiments, calculates the contribution ratio based on the edge intensity, the method of calculating the contribution ratio is not limited to the method using the edge intensity. For example, here is an assumable case where the captured image is a stereo image including a standard image and a reference image. At this time, the contribution ratio calculation unit 143a may calculate the contribution ratio using, as a feature amount, a matching evaluation value indicating a degree of matching between the template image (predetermined range) of the standard image including the target pixel i and the template image (corresponding range) of the reference image corresponding to the template image.

The control device that controls the image processing device 10 of the present embodiment may be actualized by a dedicated computer system or by a general-purpose computer system.

For example, a program for executing the above-described operations (for example, the depth correction process) is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a device outside the image processing device 10 (for example, a personal computer) or a device inside the image processing device 10 (for example, the control unit 14).

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processes described in the above embodiments, all or a part of the processes described as being performed automatically may be manually performed, or the processes described as being performed manually can be performed automatically by known methods. In addition, the processing procedures, specific names, and information including various data and parameters illustrated in the above documents or drawings can be arbitrarily altered unless otherwise specified. For example, various types of information illustrated in each of drawings are not limited to the information illustrated.

In addition, each of components of each of devices is provided as a functional and conceptional illustration and thus does not necessarily have to be physically configured as illustrated. That is, the specific form of distribution/integration of each of devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the flowcharts of the present embodiment can be changed as appropriate.

Furthermore, the present embodiment can be implemented as any configuration constituting a device or a system, for example, a processor as a System-on-Chip (SoC; also referred to as system Large Scale Integration (LSI) or the like), a module using a plurality of processors or the like, a unit using a plurality of modules or the like, a set obtained by further adding other functions to the unit, or the like (that is, a configuration of a part of the device).

In the present embodiment, a system represents a set of a plurality of constituents (devices, modules (components), or the like), and whether all the components are in the same housing would not be a big issue. Therefore, a plurality of devices housed in separate housings and connected via a network, and one device in which a plurality of modules is housed in one housing, are both systems.

Furthermore, for example, the present embodiment can adopt a configuration of cloud computing in which one function is cooperatively shared and processed by a plurality of devices via a network.

6. Conclusion

As described above, according to one embodiment of the present disclosure, it is possible to correct an erroneous estimation result that occurs when regions in which different output values are expected are mixed in a template image, onto an output result of calculation obtained by comparing image signals, represented by template matching or the like. For example, in stereo image processing, it is possible to correct the pseudo depth occurring in a case where pixels at different distances are mixed in the template image. Specifically, when there are a textured region and a flat region at different distances in the template image, it is possible to correct the pseudo depth erroneously estimated in the flat region.

The present embodiment can be applied to applications such as foreground/background extraction and refocusing processing using a depth image. Furthermore, the present embodiment can be widely applied to the correction of an output result calculated by comparison of image signals, and thus can correct an output result such as optical flow estimation or object detection.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and a modification as appropriate.

The effects described in individual embodiments of the present specification are merely examples, and thus, there may be other effects, not limited to the exemplified effects.

Note that the present technology can also have the following configurations.

(1)
An image processing device comprising:
a contribution ratio calculation unit that calculates a contribution ratio of a predetermined pixel or a predetermined region in depth calculation in each of a plurality of pixels or a plurality of regions included in an input image; and
a correction unit that corrects a depth value of the predetermined pixel or the predetermined region based on the contribution ratio.

(2)
The image processing device according to (1),
wherein the contribution ratio calculation unit calculates the contribution ratio of the predetermined pixel in the depth calculation for each of a plurality of pixels in a predetermined range of the input image including the predetermined pixel, and
the correction unit calculates a corrected depth value of the predetermined pixel based on the contribution ratio of the predetermined pixel in the depth calculation of each of the plurality of pixels in the predetermined range.

(3)
The image processing device according to (2),
wherein the correction unit calculates the corrected depth value for the depth value of the predetermined pixel based on a weighted mean of the depth values of the plurality of pixels using the contribution ratio of the predetermined pixel in the depth calculation of each of the plurality of pixels in the predetermined range, as a weight.

(4)
The image processing device according to (2),
wherein the correction unit calculates the corrected depth value for the depth value of the predetermined pixel based on a weighted median of the depth values of the plurality of pixels using the contribution ratio of the predetermined pixel in the depth calculation of each of the plurality of pixels in the predetermined range, as a weight.

(5)
The image processing device according to (1),
wherein the contribution ratio calculation unit calculates the contribution ratio of the predetermined region in the depth calculation for each of a plurality of regions in a predetermined range of the input image including the predetermined region, and
the correction unit calculates a corrected depth value of the predetermined region based on the contribution ratio of the predetermined region in the depth calculation of each of the plurality of regions in the predetermined range.

(6)
The image processing device according to (5),
wherein the correction unit calculates the corrected depth value for the depth value of the predetermined region based on a weighted mean of the depth values of the plurality of regions using the contribution ratio of the predetermined region in the depth calculation of each of the plurality of regions in the predetermined range, as a weight.

(7)
The image processing device according to (5),
wherein the correction unit calculates the corrected depth value for the depth value of the predetermined region based on a weighted median of the depth values of the plurality of regions using the contribution ratio of the predetermined region in the depth calculation of each of the plurality of regions in the predetermined range, as a weight.

(8)
The image processing device according to any one of (1) to (7), further comprising
a correction intensity calculation unit that calculates a correction intensity for correcting one image out of a depth image obtained by the depth calculation and a corrected depth image obtained by the correction of the depth value by the correction unit, based on the other image out of the depth image and the corrected depth image.

(9)
The image processing device according to (8),
wherein the correction intensity is a coefficient for applying $\alpha$-blending on the depth image and the corrected depth image.

(10)
The image processing device according to (8) or (9),
wherein the correction intensity calculation unit calculates the correction intensity based on a feature amount of each of the plurality of pixels included in the input image.

(11)
The image processing device according to (10),
wherein the correction intensity calculation unit calculates the correction intensity based on a deviation of the feature amount within a predetermined range of the input image including the predetermined pixel.

(12)
The image processing device according to (8) or (9),
wherein the correction intensity calculation unit calculates the correction intensity based on a feature amount of each of the plurality of regions included in the input image.

(13)
The image processing device according to (12),
wherein the correction intensity calculation unit calculates the correction intensity based on a deviation of the feature amount within a predetermined range of the input image including the predetermined region.

(14)
The image processing device according to any one of (1) to (13),
wherein the contribution ratio calculation unit calculates the contribution ratio of the predetermined pixel or the predetermined region based on a feature amount of each of the plurality of pixels or the plurality of regions included in the input image.

(15)
The image processing device according to (14),
wherein the feature amount is edge intensity, and
the contribution ratio calculation unit calculates the contribution ratio of the predetermined pixel based on the edge intensity of each of a plurality of pixels in a predetermined range of the input image including the predetermined pixel.

(16)
The image processing device according to (14),
wherein the input image is a stereo image including a first image defined as a standard image and a second image defined as a reference image, and
the contribution ratio calculation unit calculates the feature amount based on at least one image out of the first image and the second image.

(17)
The image processing device according to (14),
wherein the contribution ratio calculation unit calculates the contribution ratio based on a sum of the feature amount of each of a plurality of pixels in a predetermined range of the input image including the predetermined pixel.

(18)
The image processing device according to (14),
wherein the input image is a stereo image including a first image defined as a standard image and a second image defined as a reference image, and
the contribution ratio calculation unit calculates the contribution ratio using, as the feature amount, a matching evaluation value indicating a degree of matching between a predetermined range of the first image including the predetermined pixel and a corresponding range of the second image corresponding to the predetermined range.

(19)
An image processing method comprising:
calculating a contribution ratio of a predetermined pixel or a predetermined region in depth calculation in each of a plurality of pixels or a plurality of regions included in an input image; and
correcting a depth value of the predetermined pixel or the predetermined region based on the contribution ratio.

(20)
An estimation program for causing a computer to function as:
a contribution ratio calculation unit that calculates a contribution ratio of a predetermined pixel or a predetermined region in depth calculation in each of a plurality of pixels or a plurality of regions included in an input image; and
a correction unit that corrects a depth value of the predetermined pixel or the predetermined region based on the contribution ratio.

REFERENCE SIGNS LIST

10 IMAGE PROCESSING DEVICE
11 INPUT/OUTPUT UNIT
12 IMAGING UNIT
13 STORAGE UNIT
14 CONTROL UNIT
141 ACQUISITION UNIT
142 PARALLAX CALCULATION UNIT
142a TEMPLATE IMAGE DETERMINATION UNIT
142b EVALUATION VALUE CALCULATION UNIT
142c PARALLAX DETERMINATION UNIT
143 DEPTH CORRECTION UNIT
143a CONTRIBUTION RATIO CALCULATION UNIT
143b CORRECTION UNIT
143c CORRECTION INTENSITY CALCULATION UNIT
144 OUTPUT CONTROL UNIT

The invention claimed is:

1. An image processing device comprising:
a contribution ratio calculation unit configured to calculate a contribution ratio of a predetermined pixel or a predetermined region in depth calculation in each of a plurality of pixels or a plurality of regions included in an input image; and
a correction unit configured to correct a depth value of the predetermined pixel or the predetermined region based on the contribution ratio,
wherein the correction unit corrects the depth value using a depth edge map calculated using the input image and at least one of a preceding image or a succeeding image, and
wherein the contribution ratio calculation unit and the correction unit are each implemented via at least one processor.

2. The image processing device according to claim 1,
wherein the contribution ratio calculation unit calculates the contribution ratio of the predetermined pixel in the depth calculation for each of a plurality of pixels in a predetermined range of the input image including the predetermined pixel, and
wherein the correction unit is further configured to calculate a corrected depth value of the predetermined pixel based on the contribution ratio of the predetermined pixel in the depth calculation of each of the plurality of pixels in the predetermined range.

3. The image processing device according to claim 2,
wherein the correction unit calculates the corrected depth value for the depth value of the predetermined pixel based on a weighted mean of the depth values of the plurality of pixels using the contribution ratio of the predetermined pixel in the depth calculation of each of the plurality of pixels in the predetermined range, as a weight.

4. The image processing device according to claim 2,
wherein the correction unit calculates the corrected depth value for the depth value of the predetermined pixel based on a weighted median of the depth values of the plurality of pixels using the contribution ratio of the predetermined pixel in the depth calculation of each of the plurality of pixels in the predetermined range, as a weight.

5. The image processing device according to claim 1,
wherein the contribution ratio calculation unit calculates the contribution ratio of the predetermined region in the depth calculation for each of a plurality of regions in a predetermined range of the input image including the predetermined region, and
wherein the correction unit calculates a corrected depth value of the predetermined region based on the contribution ratio of the predetermined region in the depth calculation of each of the plurality of regions in the predetermined range.

6. The image processing device according to claim 5,
wherein the correction unit calculates the corrected depth value for the depth value of the predetermined region based on a weighted mean of the depth values of the plurality of regions using the contribution ratio of the predetermined region in the depth calculation of each of the plurality of regions in the predetermined range, as a weight.

7. The image processing device according to claim 5, wherein the correction unit calculates the corrected depth value for the depth value of the predetermined region based on a weighted median of the depth values of the plurality of regions using the contribution ratio of the predetermined region in the depth calculation of each of the plurality of regions in the predetermined range, as a weight.

8. The image processing device according to claim 1, further comprising:
a correction intensity calculation unit configured to calculate a correction intensity for correcting one image out of a depth image obtained by the depth calculation and a corrected depth image obtained by the correction of the depth value by the correction unit, based on the other image out of the depth image and the corrected depth image,
wherein the correction intensity calculation unit is implemented via at least one processor.

9. The image processing device according to claim 8, wherein the correction intensity is a coefficient for applying α-blending on the depth image and the corrected depth image.

10. The image processing device according to claim 8, wherein the correction intensity calculation unit calculates the correction intensity based on a feature amount of each of the plurality of pixels included in the input image.

11. The image processing device according to claim 10, wherein the correction intensity calculation unit calculates the correction intensity based on a deviation of the feature amount within a predetermined range of the input image including the predetermined pixel.

12. The image processing device according to claim 8, wherein the correction intensity calculation unit calculates the correction intensity based on a feature amount of each of the plurality of regions included in the input image.

13. The image processing device according to claim 12, wherein the correction intensity calculation unit calculates the correction intensity based on a deviation of the feature amount within a predetermined range of the input image including the predetermined region.

14. The image processing device according to claim 1, wherein the contribution ratio calculation unit calculates the contribution ratio of the predetermined pixel or the predetermined region based on a feature amount of each of the plurality of pixels or the plurality of regions included in the input image.

15. The image processing device according to claim 14, wherein the feature amount includes edge intensity, and
wherein the contribution ratio calculation unit calculates the contribution ratio of the predetermined pixel based on the edge intensity of each of a plurality of pixels in a predetermined range of the input image including the predetermined pixel.

16. The image processing device according to claim 14, wherein the input image is a stereo image including a first image defined as a standard image and a second image defined as a reference image, and
wherein the contribution ratio calculation unit calculates the feature amount based on at least one image out of the first image and the second image.

17. The image processing device according to claim 14, wherein the contribution ratio calculation unit calculates the contribution ratio based on a sum of the feature amount of each of a plurality of pixels in a predetermined range of the input image including the predetermined pixel.

18. The image processing device according to claim 14, wherein the input image is a stereo image including a first image defined as a standard image and a second image defined as a reference image, and
wherein the contribution ratio calculation unit calculates the contribution ratio using, as the feature amount, a matching evaluation value indicating a degree of matching between a predetermined range of the first image including the predetermined pixel and a corresponding range of the second image corresponding to the predetermined range.

19. An image processing method comprising:
calculating a contribution ratio of a predetermined pixel or a predetermined region in depth calculation in each of a plurality of pixels or a plurality of regions included in an input image; and
correcting a depth value of the predetermined pixel or the predetermined region based on the contribution ratio,
wherein the depth value is corrected using a depth edge map calculated using the input image and at least one of a preceding image or a succeeding image.

* * * * *